United States Patent
Seo et al.

(10) Patent No.: US 9,974,097 B2
(45) Date of Patent: May 15, 2018

(54) METHOD AND APPARATUS FOR DETERMINING TRANSPORT BLOCK SIZE IN WIRELESS COMMUNICATION SYSTEM

(71) Applicant: LG ELECTRONICS INC., Seoul (KR)

(72) Inventors: Dongyoun Seo, Seoul (KR); Hanbyul Seo, Seoul (KR); Kijun Kim, Seoul (KR); Joonkui Ahn, Seoul (KR); Hakseong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 188 days.

(21) Appl. No.: 14/649,130

(22) PCT Filed: Dec. 3, 2013

(86) PCT No.: PCT/KR2013/011122
§ 371 (c)(1),
(2) Date: Jun. 2, 2015

(87) PCT Pub. No.: WO2014/088294
PCT Pub. Date: Jun. 12, 2014

(65) Prior Publication Data
US 2015/0319776 A1 Nov. 5, 2015

Related U.S. Application Data

(60) Provisional application No. 61/830,613, filed on Jun. 3, 2013, provisional application No. 61/732,403, filed on Dec. 3, 2012.

(51) Int. Cl.
*H04W 72/04* (2009.01)
*H04W 74/00* (2009.01)
(Continued)

(52) U.S. Cl.
CPC ........ *H04W 74/002* (2013.01); *H04B 7/0623* (2013.01); *H04B 7/208* (2013.01);
(Continued)

(58) Field of Classification Search
None
See application file for complete search history.

(56) References Cited

U.S. PATENT DOCUMENTS

2010/0027450 A1* 2/2010 Montojo ............... H04L 1/0017
370/311
2010/0254331 A1* 10/2010 Kim ...................... H04L 1/0026
370/329
(Continued)

FOREIGN PATENT DOCUMENTS

EP 1 917 824 A1 5/2008
KR 10-2008-0065880 A 7/2008
(Continued)

OTHER PUBLICATIONS

LG Electronics, "TBS determination for PDSCH scheduled by EPDCCH", R1-124331, 3GPP TSG RAN WG1 Meeting #70bis, San Diego, USA, Oct. 8-12, 2012, See pp. 1, 2.

*Primary Examiner* — Hassan Phillips
*Assistant Examiner* — Ayanah George
(74) *Attorney, Agent, or Firm* — Birch, Stewart, Kolasch & Birch, LLP

(57) ABSTRACT

A method for determining a transport block size in a wireless communication system, and an apparatus using the method are provided. The method comprises: determining the number of effective resource blocks; and determining the transport block size of data transmitted on a data channel according to the number of effective resource blocks. In addition, a method for transmitting ACK/NACK (acknowledgement/not-acknowledgement) is provided.

8 Claims, 11 Drawing Sheets

(51) Int. Cl.
*H04L 27/26* (2006.01)
*H04B 7/06* (2006.01)
*H04B 7/208* (2006.01)
*H04L 1/16* (2006.01)
*H04L 1/18* (2006.01)
*H04W 88/00* (2009.01)
*H04W 88/08* (2009.01)

(52) U.S. Cl.
CPC .......... *H04L 1/1671* (2013.01); *H04L 1/1819* (2013.01); *H04L 1/1822* (2013.01); *H04L 27/2646* (2013.01); *H04W 72/04* (2013.01); *H04W 88/005* (2013.01); *H04W 88/08* (2013.01)

(56) References Cited

U.S. PATENT DOCUMENTS

| | | |
|---|---|---|
| 2012/0039239 A1 | 2/2012 | Park et al. |
| 2012/0057529 A1 | 3/2012 | Seo et al. |
| 2012/0307733 A1 | 12/2012 | Kim |
| 2013/0028092 A1* | 1/2013 | Tong ................ H04L 47/26 370/236 |
| 2013/0308504 A1* | 11/2013 | Nimbalker .......... H04L 5/001 370/281 |
| 2015/0003379 A1 | 1/2015 | Han et al. |

FOREIGN PATENT DOCUMENTS

| | | |
|---|---|---|
| KR | 10-2012-0130162 A | 11/2012 |
| WO | WO 2007/024098 A1 | 3/2007 |
| WO | Wo 2010/095871 A2 | 8/2010 |
| WO | WO 2010/110607 A2 | 9/2010 |
| WO | WO 2011/087260 A2 | 7/2011 |

\* cited by examiner

FIG. 10
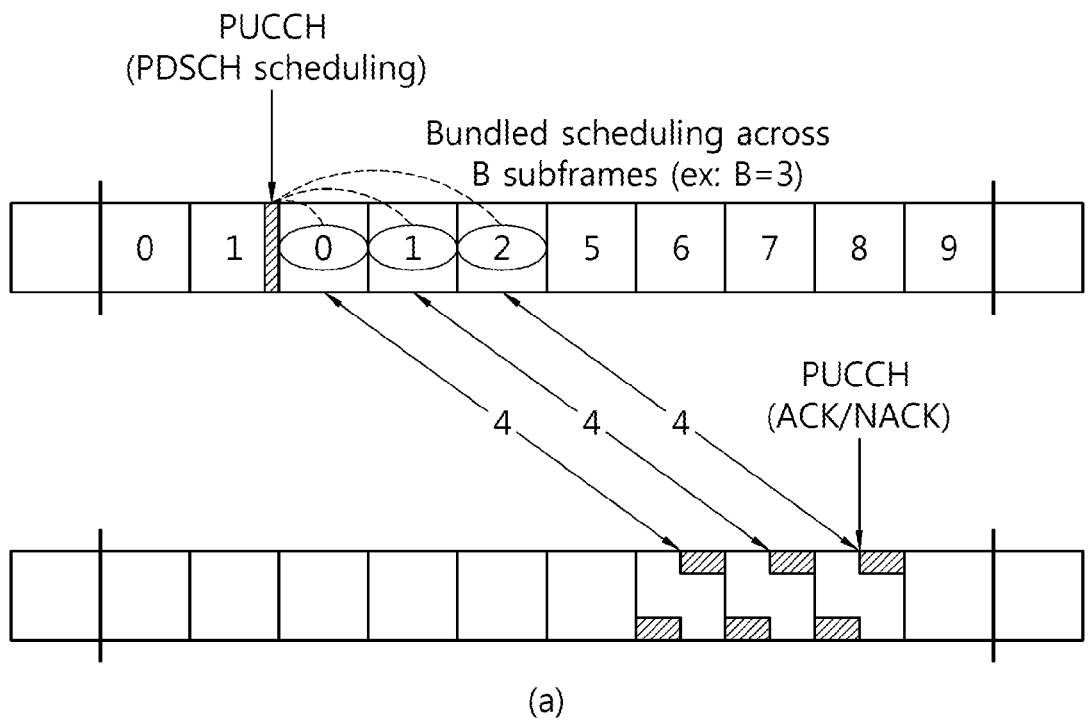
(a)
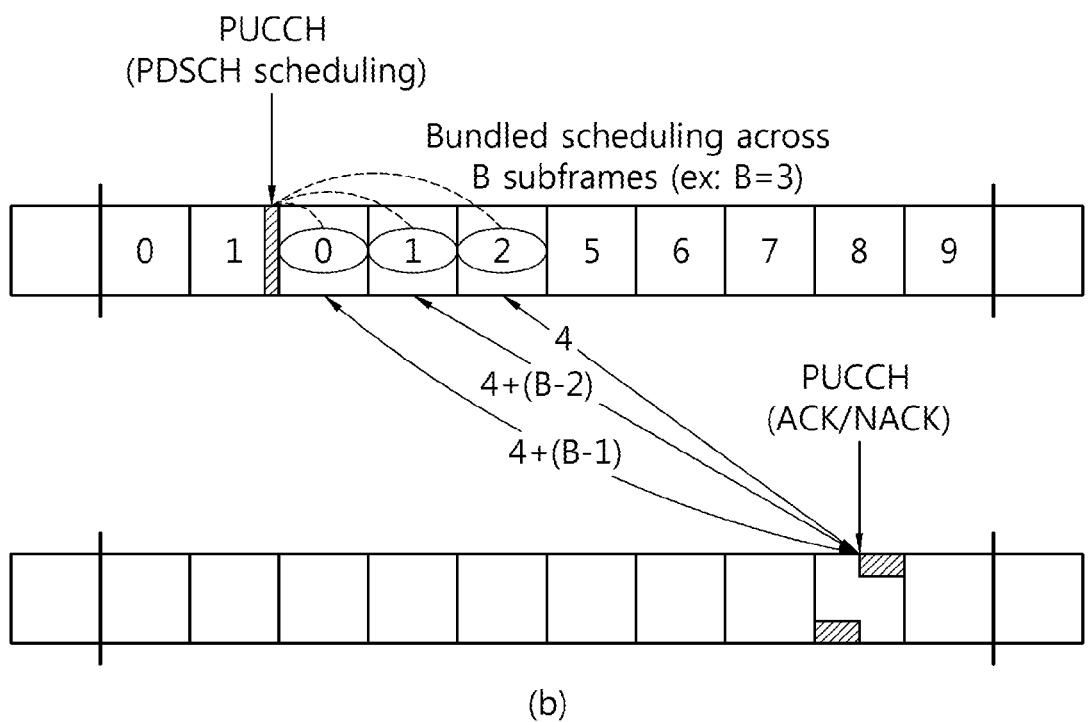
(b)

METHOD AND APPARATUS FOR DETERMINING TRANSPORT BLOCK SIZE IN WIRELESS COMMUNICATION SYSTEM

CROSS REFERENCE TO RELATED APPLICATIONS

This application is the National Phase of PCT International Application No. PCT/KR2013/011122, filed on Dec. 3, 2013, which claims priority under 35 U.S.C. 119(e) to U.S. Provisional Application Nos. 61/732,403, filed on Dec. 3, 2012 and 61/830,613, filed on Jun. 3, 2013, all of which are hereby expressly incorporated by reference into the present application.

BACKGROUND OF THE INVENTION

Field of the Invention

The present invention relates to wireless communication, and more particularly, to a method and apparatus for determining a size of a transport block in a wireless communication system.

Related Art

A system configured in a next-generation wireless communication system may be different from that of the conventional wireless communication system. For example, a machine type communication (MTC) terminal may be used in the next-generation wireless communication system. The MTC terminal implies a low cost/low specification terminal which primarily aims at data communication, such as reading a meter, measuring a water level, utilizing a surveillance camera, inventory reporting of a vending machine, etc.

Alternatively, the next-generation wireless communication system may deploy more small cells to increase a frequency reuse of the entire system, thereby being able to increase a throughput of the entire system. In addition, the next-generation wireless communication system uses coordinated multiple point (CoMP) transmission and reception as an effort for increasing a cell coverage and for more effectively utilizing resources.

The next-generation wireless communication system may require channel state information (CSI) reporting for more cells/transmission points (TPs). As a result, the CSI may need to be transmitted in a greater amount in comparison with the conventional case.

In such a situation, if data and CSI are transmitted simultaneously through a data channel, resources occupied by the CSI are increased in the data channel. As a result, resources that can be used for transmission of data in the data channel are decreased.

Meanwhile, the data is transmitted in unit of transport block (TB), and one TB or two TBs may be transmitted in one data channel according to whether spatial multiplexing using multiple layers is applied.

Conventionally, a TB size is determined according to an amount of resources allocated to the data channel and a modulation and coding scheme (MCS) in use. However, an amount of CSI transmitted together with data through the data channel is not particularly considered in the conventional wireless communication system. Accordingly, since the amount of the CSI may be increased in the next-generation wireless communication system, a method of determining a TB size by considering this is necessary.

In addition, data may be transmitted through a plurality of subframes according to a scheduling scheme. In this case, it may be ineffective to determine the TB size by considering only an amount of resources allocated in one subframe.

In addition, if acknowledgement (ACK)/not-acknowledgement (NACK) must also be transmitted in a situation where data and control information are transmitted together through a data channel, for reliable ACK/NACK transmission, it may be necessary to determine a method of configuring a resource to which the ACK/NACK is mapped and determine which channel is used to transmit the ACK/NACK between the data channel and a control channel.

SUMMARY OF THE INVENTION

The present invention provides a method of determining a size of a transport block in a wireless communication system, and an apparatus using the method.

In an aspect, a method of determining a transport block size of a terminal in a wireless communication system is provided. The method comprises determining the number of effective resource blocks and determining a transport block size of data transmitted on an uplink data channel according to the number of effective resource blocks. The number of effective resource blocks is determined on the basis of the remaining resources by excluding resources for transmitting control information from resources allocated to the uplink data channel.

In another aspect, a method of transmitting acknowledgement (ACK)/not-acknowledgement (NACK) of a terminal in a wireless communication system is provided. The method comprises allocating a resource for transmitting the ACK/NACK to an uplink data channel and transmitting the ACK/NACK through the allocated resource. The ACK/NACK is transmitted by being mapped to single-carrier frequency division multiple access (SC-FDMA) symbols adjacent to SC-FDMA symbols to which a reference signal transmitted on the uplink data channel is mapped, and to some SC-FDMA symbols among SC-FDMA symbols not adjacent to the SC-FDMA symbols to which the reference signal is mapped.

In still another aspect, a method of determining a transport block size of a base station in a wireless communication system is provided. The method comprises determining the number of effective resource blocks and determining a transport block size of data transmitted on a downlink data channel according to the number of effective resource blocks. If data is transmitted through a plurality of downlink subframes, the number of effective resource blocks is determined on the basis of a resource amount obtained by multiplying the number of a plurality of downlink subframes by the number of resource blocks allocated respectively to the plurality of downlink subframes.

In still another aspect, an apparatus is provided. The apparatus comprises a radio frequency (RF) unit for transmitting and receiving a radio signal and a processor operatively coupled to the RF unit. The processor is configured for: determining the number of effective resource blocks; and determining a transport block size of data transmitted on an uplink data channel according to the number of effective resource blocks, wherein the number of effective resource blocks is determined on the basis of the remaining resources by excluding resources for transmitting control information from resources allocated to the uplink data channel.

In still another aspect, an apparatus is provided. The apparatus comprises a radio frequency (RF) unit for transmitting and receiving a radio signal and a processor operatively coupled to the RF unit. The processor is configured for: allocating a resource for transmitting acknowledgement (ACK)/not-acknowledgement (NACK) to an uplink data channel; and transmitting the ACK/NACK through the allocated resource, wherein the ACK/NACK is transmitted by being mapped to single-carrier frequency division multiple access (SC-FDMA) symbols adjacent to SC-FDMA symbols to which a reference signal transmitted on the uplink data channel is mapped, and to some SC-FDMA symbols among SC-FDMA symbols not adjacent to the SC-FDMA symbols to which the reference signal is mapped.

According to the present invention, when channel state information and data of a transport block format are transmitted together in a data channel, a transport block size is determined by considering actual resources that can be used in data transmission. Therefore, resources can be utilized more effectively.

BRIEF DESCRIPTION OF THE DRAWINGS

FIG. 10 shows other examples of an HARQ process when performing multiple subframe scheduling.

DESCRIPTION OF EXEMPLARY EMBODIMENTS

Long term evolution (LTE) of the 3rd generation partnership project (3GPP) standard organization is a part of an evolved-universal mobile telecommunications system (E-UMTS) using an evolved-universal terrestrial radio access network (E-UTRAN). The LTE employs an orthogonal frequency division multiple access (OFDMA) in a downlink and employs single carrier-frequency division multiple access (SC-FDMA) in an uplink. LTE-advanced (LTE-A) is an evolution of the LTE. For clarity, the following description will focus on the 3GPP LTE/LTE-A. However, technical features of the present invention are not limited thereto.

A wireless device may be fixed or mobile, and may be referred to as another terminology, such as a user equipment (UE), a mobile station (MS), a mobile terminal (MT), a user terminal (UT), a subscriber station (SS), a wireless device, a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
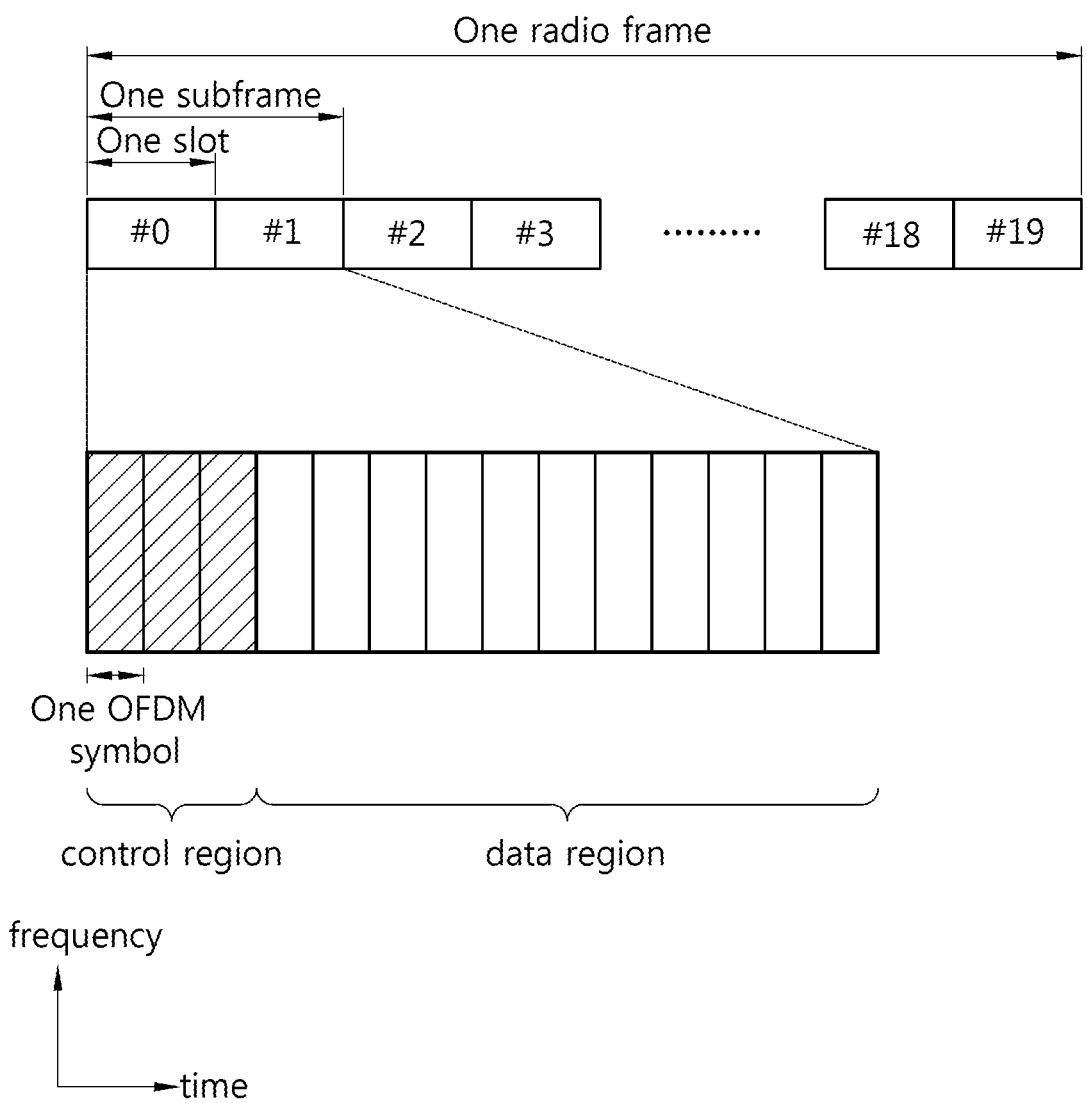
FIG. 1 shows a structure of a downlink radio frame in 3rd generation partnership project (3GPP) LTE-advanced (LTE-A).

FIG. 1 shows a structure of a downlink radio frame in 3GPP LTE-A. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. A resource consisting of one OFDM symbol in a time domain and one subcarrier in a frequency domain is called a resource element (RE). For example, if one RB includes 7 OFDM symbols in the time domain and includes 12 subcarriers in the frequency domain, one RB may include 7×12 REs. The RB may be divided into a physical resource block (PRB) and a virtual resource block (VRB). The PRB always consists of contiguous subcarriers, and the VRB may consist of non-contiguous subcarriers.

Figure 2:
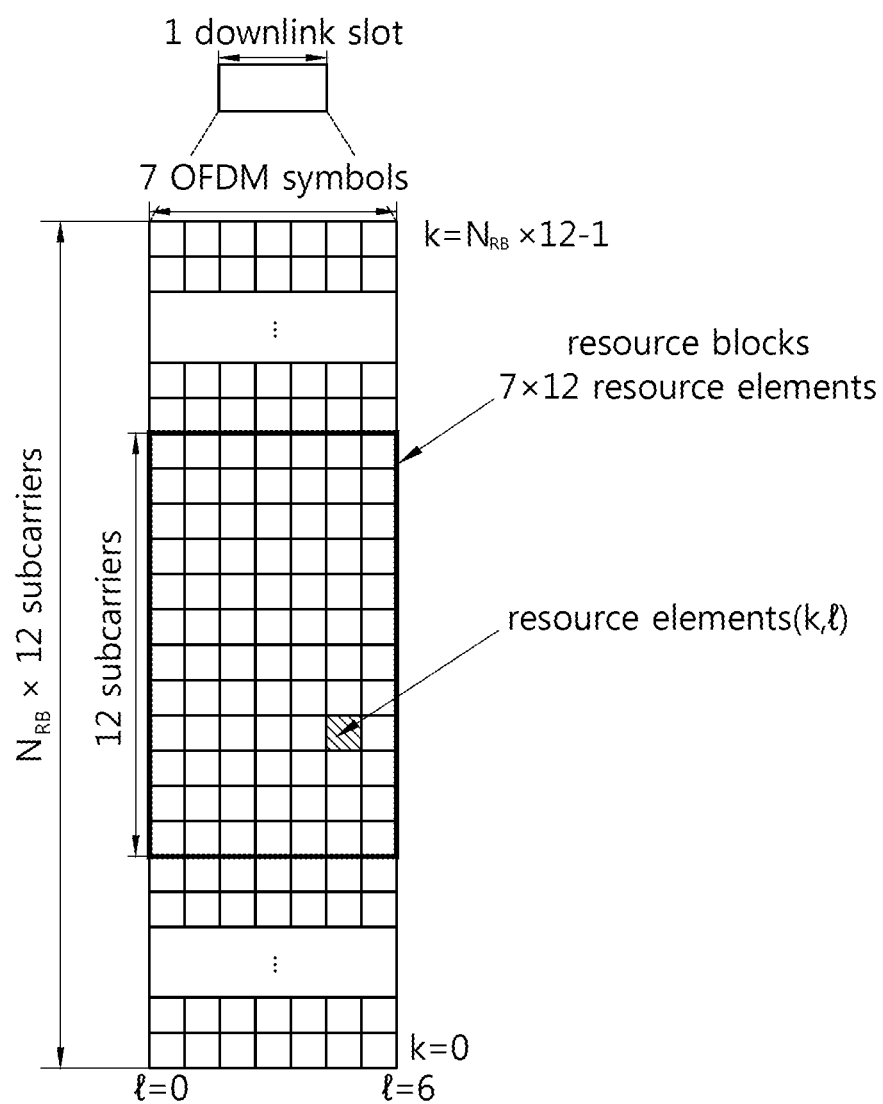
FIG. 2 shows an example of a resource grid for one downlink (DL) slot.

FIG. 2 shows an example of a resource grid for one DL slot.

Referring to FIG. 2, the DL slot includes a plurality of OFDM symbols in a time domain, and includes $N_{RB}$ resource blocks (RBs) in a frequency domain. The RB includes one slot in the time domain in a unit of resource allocation, and includes a plurality of consecutive subcarriers in the frequency domain. The number $N_{RB}$ of RBs included in the DL slot depends on a DL transmission bandwidth configured in a cell. For example, in the LTE system, $N_{RB}$ may be any one value in the range of 6 to 110. A structure of a UL slot may be the same as the aforementioned structure of the DL slot. However, in the uplink slot, an OFDM symbol may be referred to as an SC-FDMA symbol.

Each element on the resource grid is referred to as a resource element (RE). The RE on the resource grid can be identified by an index pair (k,l) within the slot. Herein, k(k=0, ..., $N_{RB}$×12-1) denotes a subcarrier index in the frequency domain, and l(l=0, ..., 6) denotes an OFDM symbol index in the time domain.

Although it is described in FIG. 2 that one RB consists of 7 OFDM symbols in the time domain and 12 subcarriers in the frequency domain and thus includes 7×12 REs, this is for exemplary purposes only. Therefore, the number of OFDM symbols and the number of subcarriers in the RB are not limited thereto. The number of OFDM symbols and the number of subcarriers may change variously depending on a CP length, a frequency spacing, etc. The number of subcarriers in one OFDM symbol may be any one value selected from 128, 256, 512, 1024, 1536, and 2048.

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.2.0, examples of a physical control channel in 3GPP LTE/LTE-A include a physical downlink control channel (PDCCH), a physical control format indicator channel (PCFICH), and a physical hybrid-ARQ indicator channel (PHICH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The conventional DCI formats transmitted through the PDCCH will be described.

A DCI format includes fields described below, and the respective fields may be mapped to information bits $a_0$ to $a_{A-1}$. The respective fields may be mapped in an order described in the respective DCI formats. Each field may have zero-padding bits. A first field may be mapped to an information bit $a_0$ having a lowest order, and consecutive other fields may be mapped to information bits having higher orders. In each field, a most significant bit (MSB) may be mapped to an information bit having a lowest order of a corresponding field. For example, an MSB of the first field may be mapped to $a_0$. Hereinafter, a set of fields included in the respective conventional DCI formats is called an information field.

1. DCI Format 0

A DCI format 0 is used for PUSCH scheduling. Examples of information (field) transmitted by using the DCI format 0 are as follows.

1) a flag for identifying the DCI format 0 and a DCI format 1A (if the flag is 0, it indicates the DCI format 0, and if the flag is 1, it indicates the DCI format 1A), 2) a hopping flag (1 bit), 3) a resource block designation and a hopping resource allocation, 4) a modulation and coding scheme and a redundancy version (5 bits), 5) a new data indicator (1 bit), 6) a TPC command (2 bits) for a scheduled PUSCH, 7) a cyclic shift (3 bits) for DM-RS, 8) a UL index, 9) a downlink designation index (only in a TDD), 10) CQI request, etc. If the number of information bits in the DCI format 0 is less than a payload size of the DCI format 1A, zero padding is performed to be equal to the payload size of the DCI format 1A.

2. DCI Format 1

A DCI format 1 is used for one PDSCH codeword scheduling. Examples of information transmitted in the DCI format 1 are as follows.

1) a resource allocation header (indicating a resource allocation type 0/type 1)—if a DL bandwidth is less than 10 PRBs, the resource allocation header is not included and the resource allocation type 0 is assumed. 2) a resource block designation, 3) a modulation and coding scheme, 4) an HARQ process number, 5) a new data indicator, 6) a redundancy version, 7) a TPC command for a PUCCH, 8) a downlink designation index (DAI) (only in a TDD), etc. If the number of information bits of the DCI format 1 is equal to that of the DCI format 0/1A, one bit having a value of '0' is added to the DCI format 1. If the number of information bits in the DCI format 1 is equal to any one of {12, 14, 16, 20, 24, 26, 32, 40, 44, 56}, a bit having one or more values of '0' is added to the DCI format 1 so that it is different from {12, 14, 16, 20, 24, 26, 32, 40, 44, 56} and has a payload size different from that of the DCI format 0/1A.

3. DCI Format 1A

A DCI format 1A is used for compact scheduling of one PDSCH codeword or a random access process.

Examples of information transmitted in the DCI format 1A are as follows. 1) a flag for identifying the DCI format 0 and the DCI format 1A, 2) a localized/distributed VRB designation flag, 3) a resource block designation, 4) a modulation and coding scheme, 5) an HARQ process number, 6) a new data indicator, 7) a redundancy version, 8) a TPC command for a PUCCH, 9) a DAI (only in a TDD), etc. If the number of information bits of the DCI format 1A is less than the number of information bits of the DCI format 0, bits having a value of '0' are added so that it has the same size as the payload size of the DCI format 0. If the number of information bits in the DCI format 1A is equal to any one of {12, 14, 16, 20, 24, 26, 32, 40, 44, 56}, a bit having one value of '0' is added to the DCI format 1A.

4. DCI Format 1B

A DCI format 1B includes precoding information and is used for compact scheduling for one PDSCH codeword. Examples of information transmitted in the DCI format 1B are as follows.

1) a localized/distributed VRB designation flag, 2) a resource block designation, 3) a modulation and coding scheme, 4) an HARQ process number, 5) a new data indicator, 6) a redundancy version, 7) a TPC command for a PUCCH, 8) a DAI (only in a TDD), 9) transmitted precoding matrix indicator (TPMI) information for precoding, 10) a PMI confirmation for precoding, etc. If the number of information bits in the DCI format 1B is equal to any one of {12, 14, 16, 20, 24, 26, 32, 40, 44, 56}, a bit having one value of '0' is added to the DCI format 1B.

5. DCI Format 1C

A DCI format 1C is used for very compact scheduling for one PDSCH codeword. Examples of information transmitted in the DCI format 1C are as follows.

1) an indicator indicating a gap value, 2) a resource block designation, 3) a transport block size index, etc.

6. DCI Format 1D

A DCI format 1D includes precoding and power offset information and is used for compact scheduling for one PDSCH codeword.

Examples of information transmitted in the DCI format 1D are as follows.

1) a localized/distributed VRB designation flag, 2) a resource block designation, 3) a modulation and coding scheme, 4) an HARQ process number, 5) a new data indicator, 6) a redundancy version, 7) a TPC command for a PUCCH, 8) a DAI (only in a TDD), 9) TPMI information for precoding, 10) a downlink power offset, etc. If the number of information bits in the DCI format 1D is equal to any one of {12, 14, 16, 20, 24, 26, 32, 40, 44, 56}, a bit having one value of '0' is added to the DCI format 1D.

7. DCI Format 2

A DCI format 2 is used to designate a PDSCH for a close-loop MIMO operation. Examples of information transmitted in the DCI format 2 are as follows.

1) a resource allocation header, 2) a resource block designation, 3) a TPC command for a PUCCH, 4) a DAI (only in a TDD), 5) an HARQ process number, 6) a transport block to codeword swap flag, 7) a modulation and coding scheme, 8) a new data indicator, 9) a redundancy version, 10) precoding information, etc.

8. DCI Format 2A

A DCI format 2A is used to designate a PDSCH for an open-loop MIMO operation. Examples of information transmitted in the DCI format 2A are as follows.

1) a resource allocation header, 2) a TPC command for a PUCCH, 3) a DAI (only in a TDD), 4) an HARQ process number, 5) a transport block to codeword swap flag, 6) a modulation and coding scheme, 7) a new data indicator, 8) a redundancy version, 9) precoding information, etc.

9. DCI Format 3

A DCI format 3 is used to transmit a TPC command for a PUCCH and a PUSCH through 2-bit power regulation. Examples of information transmitted in the DCI format 3 are as follows.

N transmit power control (TPC) commands.

10. DCI Format 3A

A DCI format 3A is used to transmit a TPC command for a PUCCH and a PUSCH through 1-bit power regulation. Examples of information transmitted in the DCI format 3A are as follows.

M TPC commands

In addition thereto, DCI formats 2B, 2C, 2D, 4, or the like may exist. Among the DCI formats, the DCI formats 0 and 4 are used for an uplink, and the remaining DCI formats are used for a downlink. Accordingly, the remaining DCI formats may be called DL DCI formats.

A BS determines a PDCCH format according to DCI to be transmitted to a wireless device, attaches a cyclic redundancy check (CRC) to control information, and masks a unique identifier (referred to as a radio network temporary identifier (RNTI)) to the CRC according to an owner or usage of the PDCCH.

If the PDCCH is for a specific wireless device, a unique identifier (e.g., cell-RNTI (C-RNTI)) of the wireless device may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the wireless device, a random access-RNTI (RA-RNTI) may be masked to the CRC. To indicate a transmit power control (TPC) command for a plurality of wireless devices, a TPC-RNTI may be masked to the CRC. In a PDCCH for semi-persistent scheduling (SPS), an SPS-C-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data. Encoding includes channel encoding and rate matching. The coded data is modulated to generate modulation symbols. The modulation symbols are mapped to physical resource elements (REs).

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Figure 3:
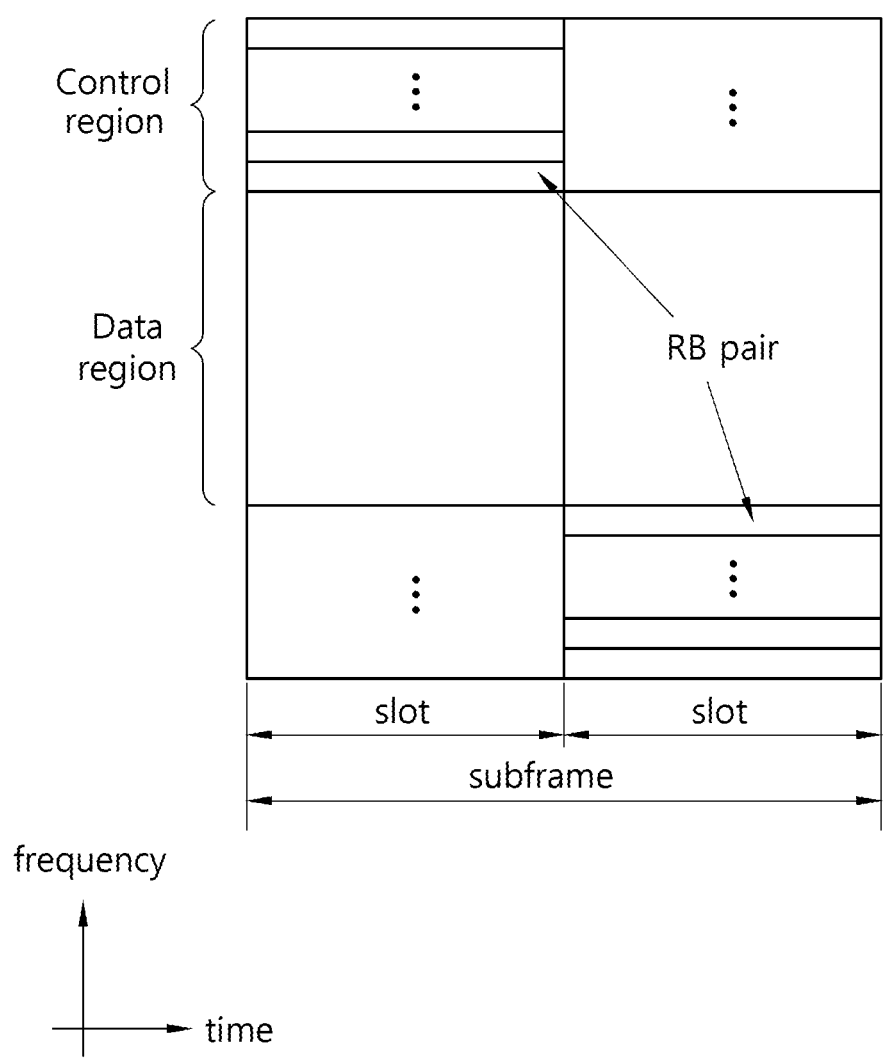
FIG. 3 shows a structure of an uplink (UL) subframe.

FIG. 3 shows a structure of a UL subframe.

Referring to FIG. 3, the UL subframe can be divided into a control region and a data region in a frequency domain. A physical uplink control channel (PUCCH) for transmitting UL control information is allocated to the control region. A physical uplink shared channel (PUSCH) for transmitting data (optionally, control information can be transmitted together) is allocated to the data region. According to a configuration, the UE may simultaneously transmit the PUCCH and the PUSCH, or may transmit any one of the PUCCH and the PUSCH.

The PUCCH for one UE is allocated in an RB pair in a subframe. RBs belonging to the RB pair occupy different subcarriers in each of a 1st slot and a 2nd slot. A frequency occupied by the RBs belonging to the RB pair allocated to the PUCCH changes at a slot boundary. This is called that the RB pair allocated to the PUCCH is frequency-hopped in a slot boundary. By transmitting UL control information over time through different subcarriers, a frequency diversity gain can be obtained.

A hybrid automatic repeat request (HARQ) acknowledgement (ACK)/non-acknowledgment (NACK) and channel status information (CSI) indicating a DL channel status (e.g., channel quality indicator (CQI), a precoding matrix index (PMI), a precoding type indicator (PTI), a rank indication (RI)) can be transmitted on the PUCCH.

The CQI provides information on a link-adaptive parameter that can be supported by the UE in a given time. The CQI may indicate a data rate that can be supported by a downlink channel by considering a UE receiver's property, signal to interference plus noise ratio (SINR), etc. The BS can use the CQI to determine a modulation (e.g., QPSK, 16-QAM, 64-QAM, etc.) and coding rate to be applied to the downlink channel. The CQI can be generated by using various methods. Examples of the methods include a method of feeding back the channel status by directly quantizing it, a method of feeding back the channel status by calculating an SINR, and a method of reporting a status actually applied to a channel, such as a modulation coding scheme (MCS). When the CQI is generated based on the MCS, the MCS includes a modulation scheme, a coding scheme, and a coding rate depending on the coding scheme.

The PMI provides information for a precoding matrix in precoding based on a codebook. The PMI is in association with multiple input multiple output (MIMO). When the PMI is fed back in MIMO, it is called closed-loop MIMO.

The RI is information regarding the number of layers recommended by the UE. That is, the RI indicates the number of independent streams used in spatial multiplexing. The RI is fed back only when it operates in a MIMO mode in which the UE uses spatial multiplexing. The RI is always in association with one or more CQI feedbacks. That is, a specific RI value is assumed in calculation of the CQI to be fed back. A rank of a channel changes slowly in general in comparison with the CQI, and thus the RI is fed back less frequently than the CQI. An RI transmission periodicity may be a multiple of a CQI/PMI transmission periodicity. The RI is given for a whole system band, and a frequency selective RI feedback is not supported.

A periodic CSI can be transmitted through the PUCCH.

The PUSCH is mapped to an uplink shared channel (UL-SCH) which is a transport channel. UL data transmitted through the PUSCH may be a transport block which is a data block for the UL-SCH transmitted during a TTI. The transport block may include user data. Alternatively, the UL data may be multiplexed data. The multiplexed data may be obtained by multiplexing a CSI and a transport block for the UL-SCH. Examples of the CSI multiplexed to the data may include a CQI, a PMI, an RI, etc. Alternatively, the UL data may consist of only the CSI. The periodic or aperiodic CSI can be transmitted through the PUSCH.

Now, HARQ in 3GPP LTE will be described.

The 3GPP LTE uses synchronous HARQ in UL transmission, and uses asynchronous HARQ in DL transmission. In the synchronous HARQ, retransmission timing is fixed. In the asynchronous HARQ, the retransmission timing is not fixed. That is, in the synchronous HARQ, initial transmission and retransmission are performed with an HARQ period.

Figure 4:
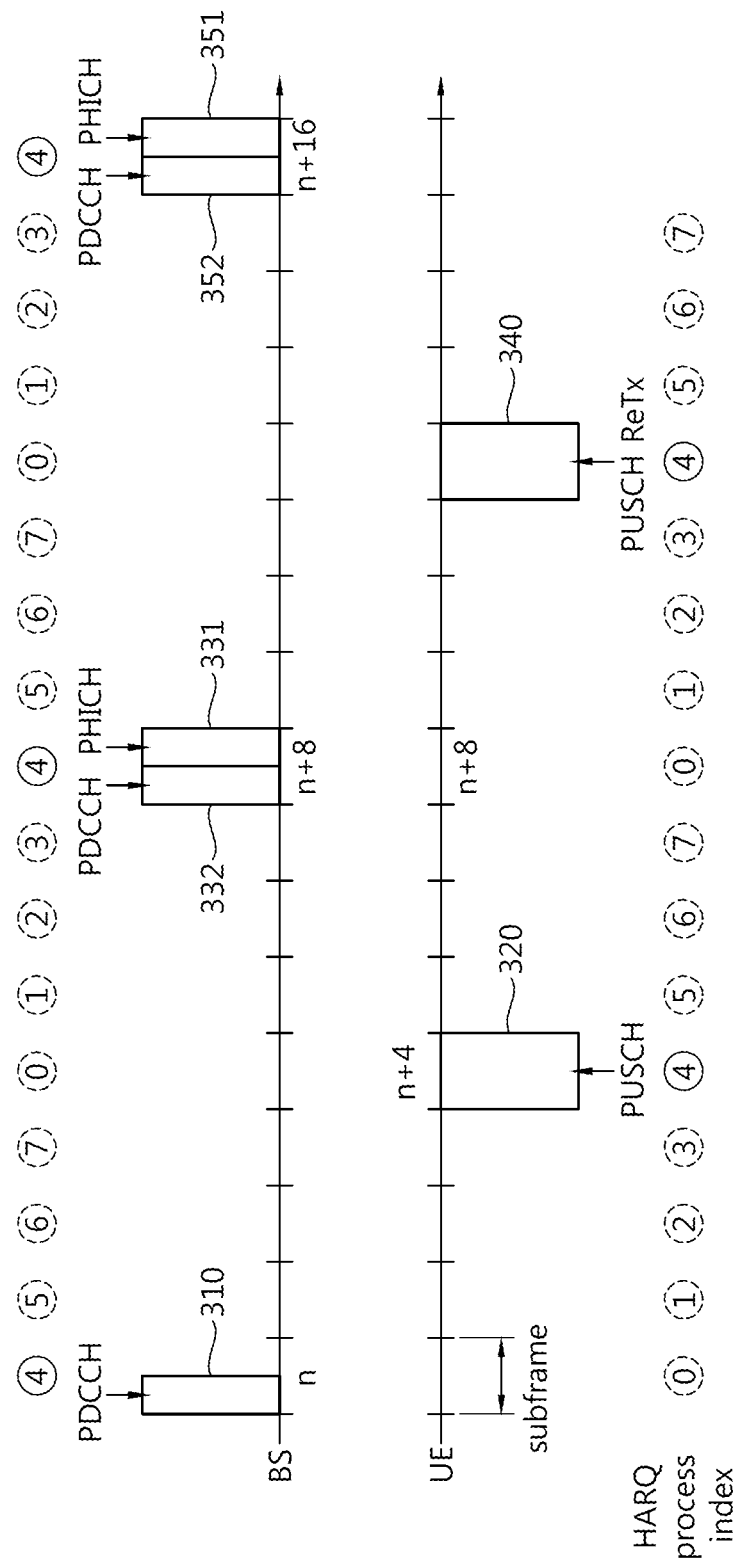
FIG. 4 shows UL synchronous hybrid automatic repeat request (HARQ) in 3GPP LTE.

FIG. 4 shows UL synchronous HARQ in 3GPP LTE.

A wireless device receives an initial UL grant on a PDCCH 310 from a BS in an $n^{th}$ subframe.

The wireless device transmits a UL transport block on a PUSCH 320 by using the initial UL grant in an $(n+4)^{th}$ subframe.

The BS sends an ACK/NACK signal for the UL transport block on a PHICH 331 in an $(n+8)^{th}$ subframe. The ACK/NACK signal indicates a reception acknowledgement for the UL transport block. The ACK signal indicates a reception success, and the NACK signal indicates a reception failure. When the ACK/NACK signal is the NACK signal, the BS may send a retransmission UL grant on a PDCCH 332, or may not send an additional UL grant. Alternatively, retransmission of previous data may be suspended and a UL grant may be sent for transmission of new data. In case the ACK signal, the BS may send the UL grant for new transmission through the PDCCH. In addition, the BS may send the UL grant. Upon receiving the retransmission UL grant, the wireless device ignores the ACK/NACK signal and follows an instruction of the retransmission UL grant. This is because the ACK/NACK signal does not have CRC and the UL grant has CRC, and thus the latter case is more reliable.

When the UL grant is not received and the NACK signal is received, the wireless device sends a retransmission block on a PUSCH 340 in an $(n+12)^{th}$ subframe. For the transmission of the retransmission block, if the retransmission UL grant is received on the PDCCH 332, the wireless device uses the retransmission UL grant, and if the retransmission UL grant is not received, the wireless device uses the initial UL grant.

The BS sends an ACK/NACK signal for the UL transport block on a PHICH 351 in an $(n+16)^{th}$ subframe. When the ACK/NACK signal is the NACK signal, the BS may send a retransmission UL grant on a PDCCH 352, or may not send an additional UL grant.

After initial transmission is performed in the $(n+4)^{th}$ subframe, retransmission is performed in the $(n+12)^{th}$ subframe, and thus synchronous HARQ is performed with an HARQ period corresponding to 8 subframes.

Therefore, in frequency division duplex (FDD) of 3GPP LTE, 8 HARQ processes can be performed, and the respective HARQ processes are indexed from 0 to 7.

<Carrier Aggregation>

Now, a carrier aggregation system will be described.

Figure 5:
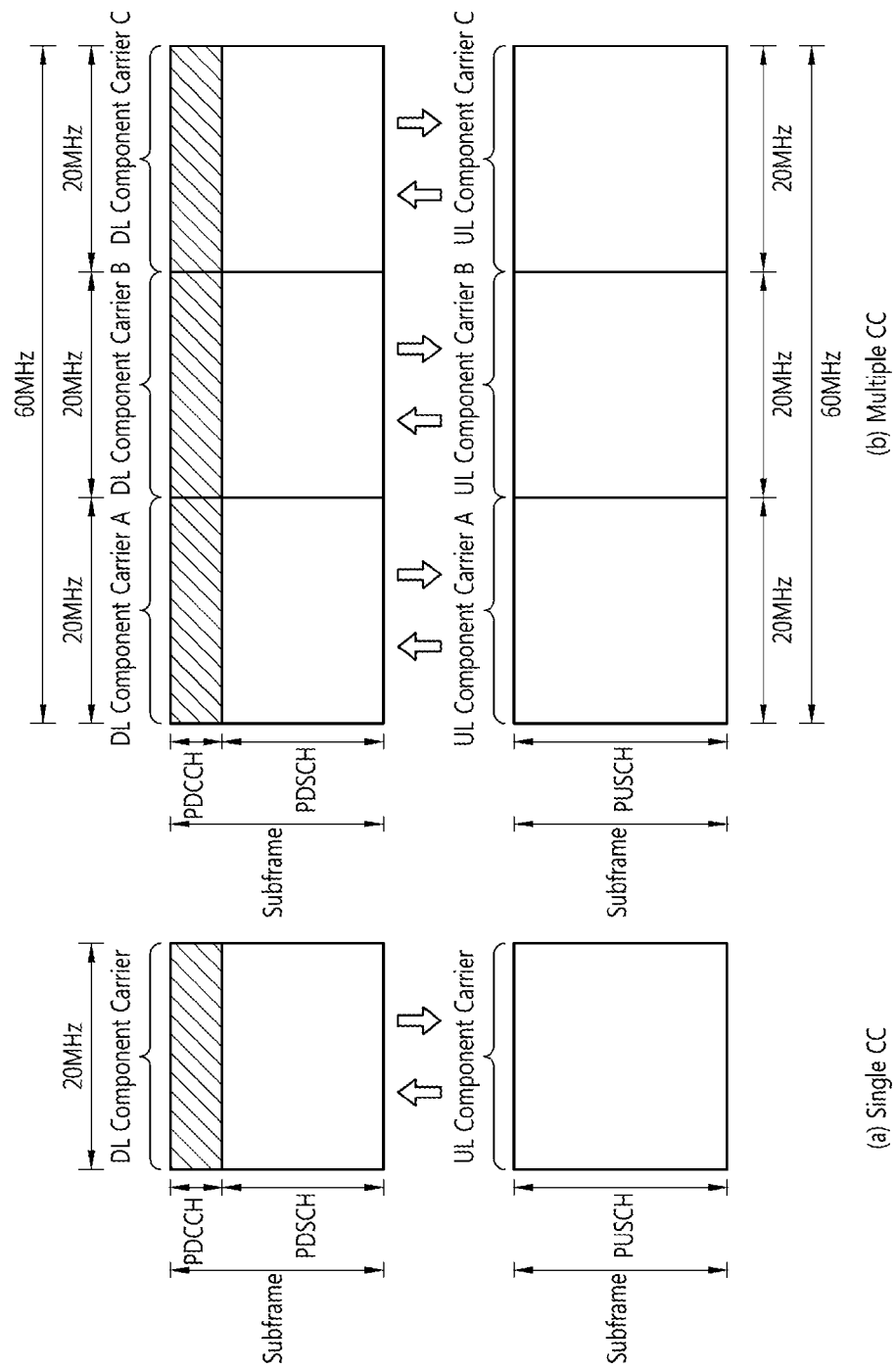
FIG. 5 shows an example of comparing a legacy single-carrier system and a carrier aggregation system.

FIG. 5 shows an example of comparing a legacy single-carrier system and a carrier aggregation system.

Referring to FIG. 5, only one carrier is supported for a UE in an uplink and a downlink in the single-carrier system. Although the carrier may have various bandwidths, only one carrier is assigned to the UE. Meanwhile, multiple component carriers (CCs) (i.e., DL CCs A to C and UL CCs A to C) can be assigned to the UE in the carrier aggregation (CA) system. A CC implies a carrier used in a carrier aggregation system, and can be simply referred to as a carrier. For example, three 20 MHz CCs can be assigned to allocate a 60 MHz bandwidth to the UE.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a carrier having a bandwidth of 1.4 MHz, 3 MHz, 5 MHz, 10 MHz, 15 MHz, and 20 MHz, and a 3GPP LTE-A system can configure a broadband of 20 MHz or higher by using each carrier of the 3GPP LTE system as a CC. Alternatively, the broadband can be configured by defining a new bandwidth without having to directly use the bandwidth of the legacy system.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if carrier aggregation (CA) is not considered, uplink and downlink frequency resources can always exist in pair in one cell.

In order to transmit and receive packet data through a specific cell, the UE first has to complete a configuration of the specific cell. Herein, the configuration implies a state of completely receiving system information required for data transmission and reception for the cell. For example, the configuration may include an overall procedure that requires common physical layer parameters necessary for data transmission and reception, media access control (MAC) layer parameters, or parameters necessary for a specific operation in a radio resource control (RRC) layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The UE can monitor or receive a control channel (i.e., PDCCH) and a data channel (i.e., PDSCH) of an activated cell in order to confirm a resource (e.g., frequency, time, etc.) allocated to the UE.

The deactivation implies that transmission or reception of traffic data is impossible and measurement or transmission/reception of minimum information is possible. The UE can receive system information (SI) required for packet reception from a deactivated cell. On the other hand, the UE does not monitor or receive a control channel (i.e., PDCCH) and a data channel (i.e., PDSCH) of the deactivated cell in order to confirm a resource (e.g., frequency, time, etc.) allocated to the UE.

A cell can be classified into a primary cell, a secondary cell, a serving cell, etc.

The primary cell implies a cell which operates at a primary frequency, and also implies a cell which performs an initial connection establishment procedure or a connection re-establishment procedure or a cell indicated as the primary cell in a handover procedure.

The secondary cell implies a cell which operates at a secondary frequency, and is configured when an RRC connection is once established and is used to provide an additional radio resource.

The serving cell is configured with the primary cell in case of a UE of which carrier aggregation is not configured or which cannot provide the carrier aggregation. If the carrier aggregation is configured, the term 'serving cell' is used to indicate a cell configured for the UE, and the cell may be plural in number. One serving cell may consist of one DL CC or a pair of {DL CC, UL CC}. A plurality of serving cells may be configured with a set consisting of a primary cell and one or a plurality of cells among all secondary cells.

A primary component carrier (PCC) denotes a CC corresponding to the primary cell. The PCC is a CC that establishes an initial connection (or RRC connection) with a BS among several CCs. The PCC serves for a connection (or RRC connection) for signaling related to a plurality of CCs, and is a CC that manages a UE context which is connection information related to the UE. In addition, the PCC establishes a connection with the UE, and thus always exists in an activation state when in an RRC connected mode. A downlink CC corresponding to the primary cell is called a downlink primary component carrier (DL PCC), and an uplink CC corresponding to the primary cell is called an uplink primary component carrier (UL PCC).

A secondary component carrier (SCC) denotes a CC corresponding to a secondary cell. That is, the SCC is a CC allocated to the UE in addition to the PCC. The SCC is an extended carrier used by the UE for additional resource allocation or the like in addition to the PCC, and can be in an activation state or a deactivation state. A DL CC corresponding to the secondary cell is called a DL secondary CC (SCC). A UL CC corresponding to the secondary cell is called a UL SCC.

The primary cell and the secondary cell have the following features.

First, the primary cell is used for PUCCH transmission. Second, the primary cell is always activated, whereas the secondary cell is activated/deactivated according to a specific condition. Third, when the primary cell experiences a radio link failure (RLF), RRC re-establishment is triggered. Fourth, the primary cell can be changed by a handover procedure accompanied by a random access channel (RACH) procedure or security key modification. Fifth, non-access stratum (NAS) information is received through the primary cell. Sixth, in case of an FDD system, the primary cell always consists of a pair of a DL PCC and a UL PCC. Seventh, for each UE, a different CC can be configured as the primary cell. Eighth, the primary cell can be replaced only through a handover, cell selection/cell reselection procedure. When adding a new secondary cell, RRC signaling can be used for transmission of system information of a dedicated secondary cell.

Regarding a CC constituting a serving cell, a DL CC can construct one serving cell. Further, the DL CC can be connected to a UL CC to construct one serving cell. However, the serving cell is not constructed only with one UL CC.

Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a downlink and an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC(carrier #0)+20 MHz CC(carrier #1)+20 MHz CC(carrier #2)+20 MHz CC(carrier #3)+5 MHz CC(carrier #4).

As described above, the carrier aggregation system can support a plurality of component carriers (CCs), that is, a plurality of serving cells, unlike a single-carrier system.

The carrier aggregation system can support cross-carrier scheduling. The cross-carrier scheduling is a scheduling method capable of performing resource allocation of a PDSCH transmitted by using a different carrier through a PDCCH transmitted via a specific CC and/or resource allocation of a PUSCH transmitted via another CC other than a CC basically linked to the specific CC. That is, the PDCCH and the PDSCH can be transmitted through different DL CCs, and the PUSCH can be transmitted via a UL CC other than a UL CC linked to a DL CC on which a PDCCH including a UL grant is transmitted. As such, in a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF).

The carrier aggregation system supporting the cross-carrier scheduling may include a CIF in the conventional downlink control information (DCI) format. In a system supporting the cross-carrier scheduling, e.g., an LTE-A system, the CIF is added to the conventional DCI format (i.e., the DCI format used in LTE) and thus the number of bits can be extended by 3 bits, and the PDCCH structure can reuse the conventional coding scheme, resource allocation scheme (i.e., CCE-based resource mapping), etc.

[Method of Transmitting Channel State Information in Wireless Communication System]

In order to utilize a channel capacity given in a wireless communication system to the maximum extent possible, an MCS and a transmission power are regulated according to a given channel by using a link adaptation. In order to perform the link adaptation in a BS, there is a need to feed back channel status information of a UE.

1. Channel Status Information (CSI)

Channel information needs to be fed back for effective communication. In general, downlink channel information is transmitted through an uplink, and uplink channel information is transmitted through a downlink. Channel information indicating a channel status is called a CSI. Examples of the CSI include a precoding matrix index (PMI), a rank indicator (RI), a channel quality indicator (CQI), etc. The CSI may be generated by measuring data or a reference signal received by a UE. The reference signal may be various such as a cell specific reference signal (CRS) which is common in a cell, a channel state information reference signal (CSI-RS), a user equipment-specific reference signal (URS), etc.

2. Downlink Transmission Mode

A downlink transmission mode can be classified into 9 types described below.

Transmission mode 1: Single antenna port, port 0.

Transmission mode 2: Transmit diversity.

Transmission mode 3: Open loop spatial multiplexing: It is an open loop mode in which a rank adaptation based on RI feedback is possible. If a rank is 1, the transmit diversity may be applied. If the rank is greater than 1, a large delay CDD may be used.

Transmission mode 4: Closed loop spatial multiplexing or transmission diversity.

Transmission mode 5: Transmit diversity or multi-user MIMO.

Transmission mode 6: Transmit diversity or closed loop spatial multiplexing having single transmission layer.

Transmission mode 7: Single antenna port (port 0) is used when the number of PBCH antenna ports is 1, and otherwise, transmit diversity is used. Alternatively, single antenna port transmission (port 5) is performed.

Transmission mode 8: Single antenna port (port 0) is used when the number of PBCH antenna ports is 1, and otherwise, transmit diversity is used. Alternatively, dual layer transmission is performed using antenna ports 7 and 8, or single antenna port transmission is performed by using the port 7 or the port 8.

Transmission mode 9: Up to 8 layer transmission (ports 7 to 14).

In case of not an MBSFN subframe, if the number of PBCH antenna ports is 1, single antenna port transmission (port 0) is used, and otherwise transmit diversity is used.

In case of the MBSFN subframe, single antenna port transmission (port 7) is performed.

3. Periodic Transmission of CSI.

A CSI may be transmitted periodically through a PUCCH according to a period determined by a higher layer. A UE may be configured semi-statically by a higher layer signal so that a differential CSI (i.e., CQI,PMI,RI) is fed back periodically through the PUCCH. In this case, the UE transmits the CSI according to modes defined by the following table.

TABLE 3

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

A periodic CSI reporting mode in the PUCCH is supported as follows with respect to each of the aforementioned transmission modes.

TABLE 4

| Transmission mode | PUCCH CSI reporting modes |
|---|---|
| Transmission mode 1 | Modes 1-0, 2-0 |
| Transmission mode 2 | Modes 1-0, 2-0 |
| Transmission mode 3 | Modes 1-0, 2-0 |
| Transmission mode 4 | Modes 1-1, 2-1 |
| Transmission mode 5 | Modes 1-1, 2-1 |

TABLE 4-continued

| Transmission mode | PUCCH CSI reporting modes |
| --- | --- |
| Transmission mode 6 | Modes 1-1, 2-1 |
| Transmission mode 7 | Modes 1-0, 2-0 |
| Transmission mode 8 | Modes 1-1, 2-1 if PMI/RI reporting is set to UE; Modes 1-0, 2-0 if PMI/RI reporting is not set to UE |
| Transmission mode 9 | Modes 1-1, 2-1 if PMI/RI reporting is set to UE, and the number of CSI-RS ports is greater than 1; Modes 1-0, 2-0 if PMI/RI reporting is not set to UE or the number of CSI-RS ports is 1 |

4. Aperiodic Transmission of CSI

A PUSCH scheduling control signal transmitted through a PDCCH, that is, a UL grant, may include a control signal for requesting transmission of a CSI, that is, an aperiodic CSI request signal. In this case, a UE aperiodically reports the CSI through the PUSCH.

1) Transmission of CQI/PMI/RI through PUSCH after receiving CQI transmission request signal (i.e., CQI request).

In this case, a control signal (i.e., CQI request) for requesting transmission of a CQI is included in a PUSCH scheduling control signal (i.e., UL grant) transmitted through a PDCCH. Table 3 below shows a mode when CQI/PMI/RI are transmitted through the PUSCH.

TABLE 3

| | | PMI Feedback Type | |
| --- | --- | --- | --- |
| | No PMI | Single PMI | Multiple PMI |
| PUSCH CQI feedback type Wideband (wideband CQI) | | | Mode 1-2 |
| UE Selected (subband CQI) | Mode 2-0 | | Mode 2-2 |
| Higher Layer-configured (subband CQI) | Mode 3-0 | Mode 3-1 | |

The transmission mode of Table 3 may be indicated by a higher layer signal transmitted by the BS, and CQI/PMI/RI may be all transmitted through a PUSCH of the same subframe. The mode 2-1, mode 2-0, mode 2-2, mode 3-0, and mode 3-1 of Table 3 are described below.

1-1) Mode 1-2

A precoding matrix is selected under the assumption that data is transmitted for each subband only through a corresponding subband. A UE generates a CQI by assuming a selected precoding matrix as to a system band or a whole band (called a band set S) designated by a higher layer signal.

The UE transmits the CQI and a PMI value of each subband. In this case, a size of each subband may vary depending on a size of the system band.

1-2) Mode 2-0

A UE selects preferred M subbands as to a system band or a band (i.e., a band set S) designated by a higher layer signal. The UE generates one CQI value under the assumption that data is transmitted in the selected M subbands. The UE additionally generates one CQI (i.e., wideband CQI) as to the system band or the band set S.

When a plurality of codewords are present for the selected M subbands, a CQI value for each codeword is defined in a differential form. Differential CQI=Index corresponding to CQI value for selected M subbands-wideband CQI index The UE transmits information regarding a location of the selected M subbands, one CQI value for the selected M subbands, and a CQI value generated for a system band of a band set S. In this case, a subband size and a value M may vary depending on a size of the system band.

1-3) Mode 2-2

A UE selects a location of M preferred subbands and a single precoding matrix for the M preferred subbands simultaneously under the assumption that data is transmitted through M preferred subbands.

A CQI value for the M preferred subbands is defined for each codeword. The UE additionally generates a wideband CQI value as to the system band or the band set S.

The UE transmits information regarding the location of the M preferred subbands, one CQI value for the selected M subbands, a single precoding matrix index (PMI) for the M preferred subbands, a wideband precoding matrix index, and a wideband CQI value. In this case, the subband size and the value M may vary depending on the size of the system band.

1-4) Mode 3-0

A UE generates a wideband CQI value. The UE generates a CQI value for each subband under the assumption that data is transmitted through each subband. In this case, even if RI>1, the CQI value indicates only a CQI value for a first codeword.

1-5) Mode 3-1

A single precoding matrix is generated for a system band or a band set S. A UE generates a CQI for a subband per codeword by assuming a single precoding matrix generated previously as to each subband. The UE may generate a wideband CQI by assuming the single precoding matrix.

A CQI value of each subband is expressed in a differential form. That is, it can be obtained by 'Subband CQI=Subband CQI index-Wideband CQI index'. A subband size may vary depending on a size of a system band.

Now, the present invention will be described.

The next-generation wireless communication system may require channel state information (CSI) reporting for more cells/transmission points (TPs). As a result, the CSI may need to be transmitted in a greater amount in comparison with the conventional case. If data and control information such as CSI are transmitted simultaneously through a PUSCH, resources are increased in the PUSCH occupied by the control information. As a result, resources that can be used for transmission of data in the PUSCH are decreased.

Meanwhile, the data is transmitted in unit of transport block (TB), and one TB or two TBs may be transmitted in one data channel (e.g., a PUSCH or a PDSCH) according to whether spatial multiplexing using multiple layers is applied.

A UE determines a TB size in an uplink. First, the conventional method of determining the TB size is described.

To determine a modulation order $Q_m$ for the PUSCH, a redundancy version, and a TB size, the UE reads a 'modulation and coding scheme (MCS) and redundancy version' field (hereinafter, $I_{MCS}$) in a DCI format. Further, the UE checks for a 'CSI request' field, and calculates the total number of allocated PRB-pairs (denoted by $N_{PRB}$). Furthermore, the UE calculates the number of coded symbols of control information. The PRB-pair implies that PRBs of respective slots are allocated in pair across two slots. Hereinafter, for convenience, the PRB-pair may be simply referred to as a PRB.

For example, if $I_{MCS}$ satisfies $0 \leq I_{MCS} \leq 28$, the modulation order $Q_m$ is determined as follows.

If the UE can support 64 quadrature amplitude modulation (QAM) in a PUSCH and is not configured to perform transmission only using quadrature phase shift keying (QPSK) and 16 QAM by a higher layer, the modulation order is given by $Q'_m$ of the following table.

TABLE 4

| MCS Index $I_{MCS}$ | Modulation Order $Q_m'$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

If the UE cannot support the 64 QAM in the PUSCH or is configured to perform transmission by using only the QPSK and the 16 QAM, $Q'_m$ is first read from Table 4 above, and the modulation order $Q_m$ is set as min(4, $Q'_m$). min(a,b) returns a smaller value between a and b.

If a parameter 'ttiBundling' is set to 'true', a resource allocation size is limited to $N_{PRB} \leq 3$, and the modulation order $Q_m$ is set to 2.

Meanwhile, if $I_{MCS}$ satisfies $29 \leq I_{MCS} \leq 31$, the modulation order $Q_m$ is determined as follows.

If a DCI format 0 is used and $I_{MCS}=29$, or if a DCI format 4 is used, only 1 TB is possible, $I_{MCS}=29$ for the possible TB, and the number of signaled transmission layers is 1, then the modulation order $Q_m$ is set to 2 in a case where: 1) a CSI request field is 1 bit, and the 1 bit is configured to trigger aperiodic CSI reporting and $N_{PRB} \leq 4$; or 2) the CSI request field is 2 bits, and the 2 bits are configured to trigger aperiodic CSI reporting for one serving cell and $N_{PRB} \leq 4$; or 3) the CSI request field is 2 bits, and the 2 bits are configured to trigger aperiodic CSI reporting for two or more serving cells and $N_{PRB} \leq 20$. Otherwise, the modulation order is determined from DCI transmitted most recently from the PDCCH including a DCI format 0/4 for a TB using $0 \leq I_{MCS} \leq 28$.

If there is no PDCCH including the DCI format 0/4 for the TB using $0 \leq I_{MCS} \leq 28$, the modulation order is determined from: 1) a PDCCH allocated most recently with semi-static scheduling if a first PUSCH for the TB is semi-statically scheduled; or 2) a random access response grant for the TB if the PUSCH is initiated by the random access response grant.

The UE determines a redundancy version $rv_{idx}$ to be used in the PUSCH by using $I_{MCS}$ and Table 4 above.

Meanwhile, the TB size (TBS) is determined as follows.

If $I_{MCS}$ satisfies $0 \leq I_{MCS} \leq 28$, the UE first determines a TBS index $I_{TBS}$ by using $I_{MCS}$ and Table 4 above.

When $I_{MCS}$ satisfies $29 \leq I_{MCS} \leq 31$, in a case where: 1) a DCI format 0 is used and $I_{MCS}=29$'; or 2) a DCI format 4 is used, only one TB is available, $I_{MCS}=29$ for the available TB, and the number of transmission layers is 1, then there is no TB for data (UL-SCH) and only control information for a current PUSCH reporting mode is transmitted by the UE in the following cases where: i) a CSI request field is 1 bit, and the 1 bit is configured to trigger aperiodic CSI reporting and $N_{PRB} \leq 4$; or ii) the CSI request field is 2 bits, and the 2 bits are configured to trigger aperiodic CSI reporting for one serving cell and $N_{PRB} \leq 4$; or iii) the CSI request field is 2 bits, and the 2 bits are configured to trigger aperiodic CSI reporting for two or more serving cells and $N_{PRB} \leq 20$.

Otherwise, the TB size is determined from a first PDCCH for a TB using $0 \leq I_{MCS} \leq 28$. If there is no uplink DCI format (i.e., DCI format 0/4) for the TB using $0 \leq I_{MCS} \leq 28$, the TB size is determined from: 1) a PDCCH allocated most recently with semi-static scheduling if a first PUSCH for the TB is semi-statically scheduled; or 2) a random access response grant for the TB if the PUSCH is initiated by the random access response grant.

If a combination of $I_{MCS}=0$ and $N_{PRB}>1$ and a combination of $I_{MCS}=28$ and $N_{PRB}=1$ is signaled, a TB is disabled in the DCI format 4. Otherwise, the TB is enabled.

For $1 \leq N_{PRB} \leq 110$, the TB size may be given by Tables 5 and 6 below according to ($I_{TBS}$, $N_{PRB}$). Herein, Table 5 is for $1 \leq N_{PRB} \leq 10$, and Table 6 is for $11 \leq N_{PRB} \leq 20$. Only some parts of $1 \leq N_{PRB} \leq 110$ are expressed for convenience. For the remaining parts, i.e., for $21 \leq N_{PRB} \leq 110$, such a table as Tables 5 and 6 may be given.

TABLE 5

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |

TABLE 5-continued

| $I_{TBS}$ | \multicolumn{10}{c}{$N_{PRB}$} |
| | 1 | 2 | 3 | 4 | 5 | 6 | 7 | 8 | 9 | 10 |
|---|---|---|---|---|---|---|---|---|---|---|
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

TABLE 6

| $I_{TBS}$ | \multicolumn{10}{c}{$N_{PRB}$} |
| | 11 | 12 | 13 | 14 | 15 | 16 | 17 | 18 | 19 | 20 |
|---|---|---|---|---|---|---|---|---|---|---|
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| 2 | 472 | 520 | 568 | 616 | 648 | 696 | 744 | 776 | 840 | 872 |
| 3 | 616 | 680 | 744 | 808 | 872 | 904 | 968 | 1032 | 1096 | 1160 |
| 4 | 776 | 840 | 904 | 1000 | 1064 | 1128 | 1192 | 1288 | 1352 | 1416 |
| 5 | 968 | 1032 | 1128 | 1224 | 1320 | 1384 | 1480 | 1544 | 1672 | 1736 |
| 6 | 1128 | 1224 | 1352 | 1480 | 1544 | 1672 | 1736 | 1864 | 1992 | 2088 |
| 7 | 1320 | 1480 | 1608 | 1672 | 1800 | 1928 | 2088 | 2216 | 2344 | 2472 |
| 8 | 1544 | 1672 | 1800 | 1928 | 2088 | 2216 | 2344 | 2536 | 2664 | 2792 |
| 9 | 1736 | 1864 | 2024 | 2216 | 2344 | 2536 | 2664 | 2856 | 2984 | 3112 |
| 10 | 1928 | 2088 | 2280 | 2472 | 2664 | 2792 | 2984 | 3112 | 3368 | 3496 |
| 11 | 2216 | 2408 | 2600 | 2792 | 2984 | 3240 | 3496 | 3624 | 3880 | 4008 |
| 12 | 2472 | 2728 | 2984 | 3240 | 3368 | 3624 | 3880 | 4136 | 4392 | 4584 |
| 13 | 2856 | 3112 | 3368 | 3624 | 3880 | 4136 | 4392 | 4584 | 4968 | 5160 |
| 14 | 3112 | 3496 | 3752 | 4008 | 4264 | 4584 | 4968 | 5160 | 5544 | 5736 |
| 15 | 3368 | 3624 | 4008 | 4264 | 4584 | 4968 | 5160 | 5544 | 5736 | 6200 |
| 16 | 3624 | 3880 | 4264 | 4584 | 4968 | 5160 | 5544 | 5992 | 6200 | 6456 |
| 17 | 4008 | 4392 | 4776 | 5160 | 5352 | 5736 | 6200 | 6456 | 6712 | 7224 |
| 18 | 4392 | 4776 | 5160 | 5544 | 5992 | 6200 | 6712 | 7224 | 7480 | 7992 |
| 19 | 4776 | 5160 | 5544 | 5992 | 6456 | 6968 | 7224 | 7736 | 8248 | 8504 |
| 20 | 5160 | 5544 | 5992 | 6456 | 6968 | 7480 | 7992 | 8248 | 8760 | 9144 |
| 21 | 5544 | 5992 | 6456 | 6968 | 7480 | 7992 | 8504 | 9144 | 9528 | 9912 |
| 22 | 5992 | 6456 | 6968 | 7480 | 7992 | 8504 | 9144 | 9528 | 10296 | 10680 |
| 23 | 6200 | 6968 | 7480 | 7992 | 8504 | 9144 | 9912 | 10296 | 11064 | 11448 |
| 24 | 6712 | 7224 | 7992 | 8504 | 9144 | 9912 | 10296 | 11064 | 11448 | 12216 |
| 25 | 6968 | 7480 | 8248 | 8760 | 9528 | 10296 | 10680 | 11448 | 12216 | 12576 |
| 26 | 8248 | 8760 | 9528 | 10296 | 11064 | 11832 | 12576 | 13536 | 14112 | 14688 |

Similarly to Tables 5 and 6, a table for determining the TB size may be defined for $1 \leq N_{PRB} \leq 110$ according to ($I_{TBS}$, $N_{PRB}$).

That is, according to the conventional method, the value $I_{TBS}$ defined in Table 4 above can be known on the basis of the values $N_{PRB}$ and $I_{MCS}$, and the TB size can be determined from Tables 5 and 6 or the like on the basis of ($I_{TBS}$, $N_{PRB}$).

According to the conventional method, the TB size is determined by considering an amount of resource blocks allocated to a PUSCH or a PDSCH and a modulation coding scheme (more specifically, an MCS indicated by $I_{MCS}$) applied to the allocated resources.

However, the conventional method has a problem in that, if CSI and data are multiplexed in the same data channel as described above, a TB size of the data is determined without considering that an actual amount of resources capable of transmitting the data can be decreased.

Figure 6:
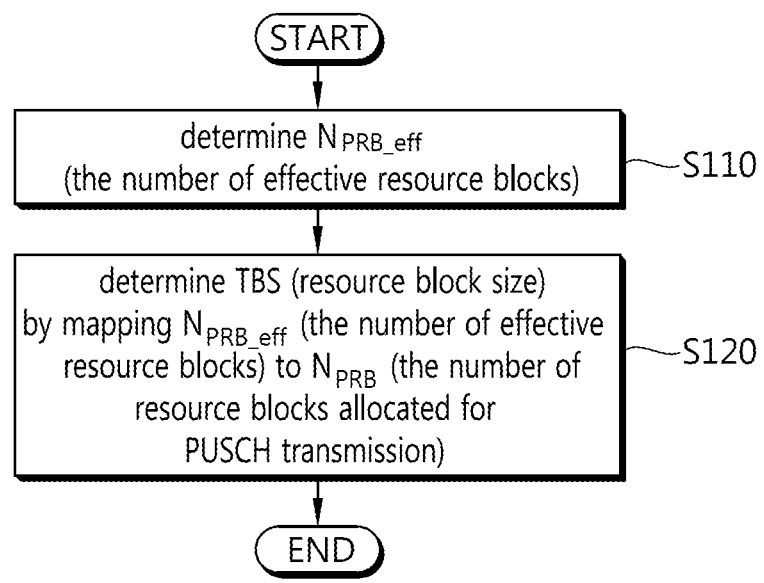
FIG. 6 shows a method of determining a TB size according to an embodiment of the present invention.

FIG. 6 shows a method of determining a TB size according to an embodiment of the present invention.

Referring to FIG. 6, a UE determines $N_{PRB\_eff}$ which is the number of effective resource blocks (S110).

The UE determines a resource block size by mapping the number of effective resource blocks to $N_{PRB}$ which is the number of resource blocks allocated for transmission of an uplink data channel, e.g., a PUSCH (S120). That is, the resource block size is determined by assuming $N_{PRB\_eff}$ which is the number of effective resource blocks as $N_{PRB}$ which is the number of allocated resource block, as shown in the above Tables 5, 6, or the like. More specifically, $N_{PRB\_eff}$ which is the number of effective resource blocks implies the number of PRB-pairs, and the resource block size is determined by assuming this as $N_{PRB}$ which is the number of allocated resource block pairs.

Each step of FIG. 6 will be described in greater detail.

1) Determining of the number of effective resource blocks.

The number of effective resource blocks is determined based on the remaining resources by excluding resources for transmitting control information from resources allocated to an uplink data channel. The control information may be channel state information (CSI) such as channel quality indicator (CQI), precoding matrix index (PMI), rank indicator (RI), etc., or acknowledgement (ACK)/not-acknowledgement (NACK).

For example, it is assumed that $N_{PRB}$ resource blocks are allocated to the UE for PUSCH transmission, and each resource block consists of A REs.

The CSI may be transmitted through B REs (where A>B) which are some parts of the A REs in each resource block. In this case, REs to be occupied by the CSI in $N_{PRB}$ resource blocks may be $B \times N_{PRB}$. The total REs to be occupied by the CSI may be approximated in unit of resource blocks as Ceil$((B \times N_{PRB})/A)$. Ceil(x) is a function indicating a smallest integer among numbers greater than or equal to x. In this case, the number of effective resource blocks may be expressed by $N_{PRB\_eff} = N_{PRB} - \{\text{Ceil}(B \times N_{PRB})/A\}$.

Alternatively, the number of effective resource blocks may be determined by approximating the number of REs, obtained by subtracting $(B \times N_{PRB})$ which is the total number of REs to be occupied by CSI from $(N_{PRB} \times A)$ which is the total number of REs of $N_{PRB}$ resource blocks, in unit of resource blocks. In this case, the number of effective resource blocks may be expressed by $N_{PRB\_eff} = \text{Ceil}\{((N_{PRB} \times A) - (B \times N_{PRB}))/A\}$ or $\text{floor}\{((N_{PRB} \times A) - (B \times N_{PRB}))/A\}$. floor(x) returns the greatest integer number among numbers less than or equal to x.

That is, the number of effective resource blocks may be determined on the basis of a value obtained by dividing the remaining resources, excluding resources for transmitting control information from resources allocated to a data channel, in unit of resource blocks.

In the processes of determining the number of effective resource blocks, SC-FDMA symbols to which demodulation reference signal (DM-RS) is allocated may be excluded. For example, in a normal CP case, a resource block pair consists of 14 SC-FDMA symbols in a time domain and consists of 12 subcarriers in a frequency domain, and thus 168 REs are included in total. When the DM-RS is transmitted in 2 SC-FDMA symbols, 24 REs included in the 2 SC-FDMA symbols are excluded. Then, the number of REs per resource block may be calculated as (A-24).

In addition, when a sounding reference signal (SRS) is transmitted in a last SC-FDMA symbol of a PUSCH, the number of effective resource blocks may be determined by excluding the SC-FDMA symbols.

In addition, in an extended CP case, the number of SC-FDMA symbols per resource block is decreased in comparison with the normal CP case. This aspect may also be considered to determine the number of effective resource blocks.

That is, when the number of REs occupied by CSI is approximated in unit of resource blocks, the number of REs per resource block may be calculated by excluding SC-FDMA symbols not used in data transmission.

Alternatively, when the number of available REs obtained by subtracting the number of REs occupied by CSI from the total number of REs of allocated resource blocks is approximated in unit of resource blocks, the number of REs in unit of resource blocks may be the number of REs that can be used in data transmission.

According to such a method, since a TB size is determined on the basis of an amount of resources capable of actually transmitting data in a data channel, resources can be more effectively used.

Meanwhile, when CSI and data are multiplexed in a PUSCH, an information bit $N_{CSI}$ of CSI is subjected to channel coding by the use of a mother code rate, and is subjected to rate matching or repetition according to a reference MCS. As a result, coded bits to be transmitted finally are determined and thereafter modulation symbols are generated. Resources occupied by the CSI are determined according to the number of the modulation symbols. The reference MCS of the CSI may be an MCS to be applied to the data.

When the data and the CSI (e.g., CQI/PMI, RI, etc.) are transmitted simultaneously, the number of modulation symbols of the data and the number of modulation symbols of the CSI must be known. If a code rate and modulation order applied to the data is correctly known, the code rate and modulation order applied to the CSI may be used by adding an offset value to the code rate and modulation order applied to the data.

It is assumed that a reciprocal of spectral efficiency obtained by using the code rate and modulation order of the data is $MCS_{data}$. Then, $MCS_{data}$ may be expressed by the following equation.

$$MCS_{data} = 1/(\text{code rate} \cdot \text{modulation order}) \quad \text{[Equation 1]}$$

It is assumed that $N_{CQI}$ denotes a payload size of CQI/PMI to be transmitted, and $\Delta_{CQI}$ denotes a variable which indicates an offset value in unit of dB to compensate for a difference between a block error rate (BLER) of data and a BLER of CQI/PMI and a difference between a method of encoding the data and a method of encoding the CQI/PMI.

Then, the number of symbols finally transmitted for the CQI/PMI may be expressed by the following equation.

$$M_{CQI} = \left\lceil N_{CQI} \cdot 10^{\frac{\Delta_{CQI}}{10}} \cdot MCS_{ref} \right\rceil \quad \text{[Equation 2]}$$

In addition, it is assumed that $N_{RI}$ denotes a payload size of RI to be transmitted, and $\Delta_{RI}$ denotes a variable which indicates an offset value in unit of dB to compensate for a difference between a BLER of data and a BLER of RI and a difference between a method of encoding the data and a method of encoding the RI. Then, the number of symbols finally transmitted for the RI may be expressed by the following equation.

$$M_{RI} = \left\lceil N_{RI} \cdot 10^{\frac{\Delta_{RI}}{10}} \cdot MCS_{ref} \right\rceil \quad \text{[Equation 3]}$$

In order to use the MCS applied to the data as the reference MCS used when obtaining resources occupied by CSI, a TB size of the data must be first obtained, and the resources occupied by the CSI must be first calculated to obtain $N_{PRB\_eff}$ for obtaining the TB size of the data. That is, there is a problem in that the calculation of the TB size of the data and the calculation of the resources occupied by the CSI are interdependent.

To solve such a problem, the following method may be used in which: 1) when calculating the resources occupied by the CSI to calculate the number of effective resource blocks, a predetermined MCS or a signaled independent MCS value may be used as a reference MCS, instead of using an MCS of data, or 2) the number of effective resource blocks may be calculated after assuming resources occupied by the CSI according to the number of bits of the CSI information bit. When the CSI is actually mapped to an RE, an MCS used for the above calculation or an MCS of data based on a TB size determined according to the number of effective resource blocks may be used as the reference MCS.

The CSI may include all of RI/PMI/CQI or the like. Alternatively, only PMI/CQI may be included except for the RI. The CSI report includes periodic CSI reporting transmitted according to a pre-set period and aperiodic CSI reporting based on dynamic triggering. The present invention may be applied to the aperiodic CSI reporting.

The aperiodic CSI reporting may be applied only to DL subframe sets designated by an RRC message. The present invention may be applied only to a case where a plurality of DL subframe sets are present among the cases where the DL subframe sets are designated with RRC.

Alternatively, the present invention may be limited only to a case where the number of DL subframes included in the DL subframe set is greater than or equal to a specific number among the cases where the DL subframe sets are designated with RRC.

Alternatively, the present invention may be limited only to a case where the number of bits for a CSI information bit exceeds a specific threshold or to a case where it is less than or equal to the specific threshold according to the number $N_{PRB}$ for scheduling. Alternatively, the present invention may be applied only to a case where it is less than or equal to the threshold according to a ratio of the number $N_{PRB}$ for scheduling and the number of bits for the CSI information bit.

Alternatively, the present invention may be applied only to a case where CSI is transmitted by being multiplexed with data like in initial transmission. This is a case where the CSI is retransmitted like in UL-SCH, when performing UL-SCH subframe bundling or retransmission based on a PHICH.

If the CSI is not multiplexed when performing retransmission, a PUSCH resource is not occupied by the CSI. Therefore, the PUSCH resource may be wasted when the number of effective resource blocks is applied if retransmission occurs frequently.

Meanwhile, the present invention may also be applied to a case where data and ACK/NACK are transmitted by being multiplexed in a PUSCH, and may also be applied to a case where ACK/NACK is multiplexed in the PUSCH together with CSI. Alternatively, this may not be considered in case of ACK/NACK since a misalignment may occur between a UE and a BS when the UE fails to receive scheduling information.

Hereinafter, a case where data and ACK/NACK are transmitted through multiplexing in a PUSCH will be described.

It is assumed that $N_{HARQ-ACK}$ denotes a payload size of ACK/NACK, and $\Delta_{HARQ-ACK}$ denotes a variable which indicates an offset value in unit of dB to compensate for a difference between a BLER of data and a BLER of ACK/NACK and a difference between a method of encoding the data and a method of encoding the ACK/NACK. $MCS_{ref}$ may denote an MCS used in data encoding.

Then, the number of symbols finally transmitted for ACK/NACK may be expressed by the following equation.

$$M_{HARQ-ACK} = \left\lceil N_{HARQ-ACK} \cdot 10^{\frac{\Delta_{HARQ-ACK}}{10}} \cdot MCS_{ref} \right\rceil \quad \text{[Equation 4]}$$

When ACK/NACK is transmitted through a PUSCH, an SC-FDMA symbol to which the ACK/NACK is mapped may be limited to 4 SC-FDMA symbols adjacent to 2 SC-FDMA symbols to which a DM-RS is allocated. In this case, according to $N_{PRB}$ allocated to a UE, $M_{HARQ-ACK} > (N_{PRB} \times 12 \times 4)$ may be satisfied, and this may be resource allocation not satisfying a requirement of ACK/NACK reception. That is, this may be a case where resources are insufficient to allocate/map modulation symbols of the ACK/NACK. Since a reception error of the ACK/NACK has a significant effect on a downlink throughput, a reliable ACK/NACK transmission method is required.

1) If it is difficult to satisfy a requirement of ACK/NACK reception when using only REs included in 4 SC-FDMA symbols, additional SC-FDMA symbols may be used for ACK/NACK mapping so that $M_{HARQ-ACK}$ can be mapped. That is, ACK/NACK may be transmitted by being mapped to some of SC-FDMA symbols among SC-FDMA symbols adjacent to SC-FDMA symbols to which a reference signal transmitted in a data channel is mapped and SC-FDMA symbols not adjacent to SC-FDMA symbols to which the reference signal is mapped.

Figure 7:
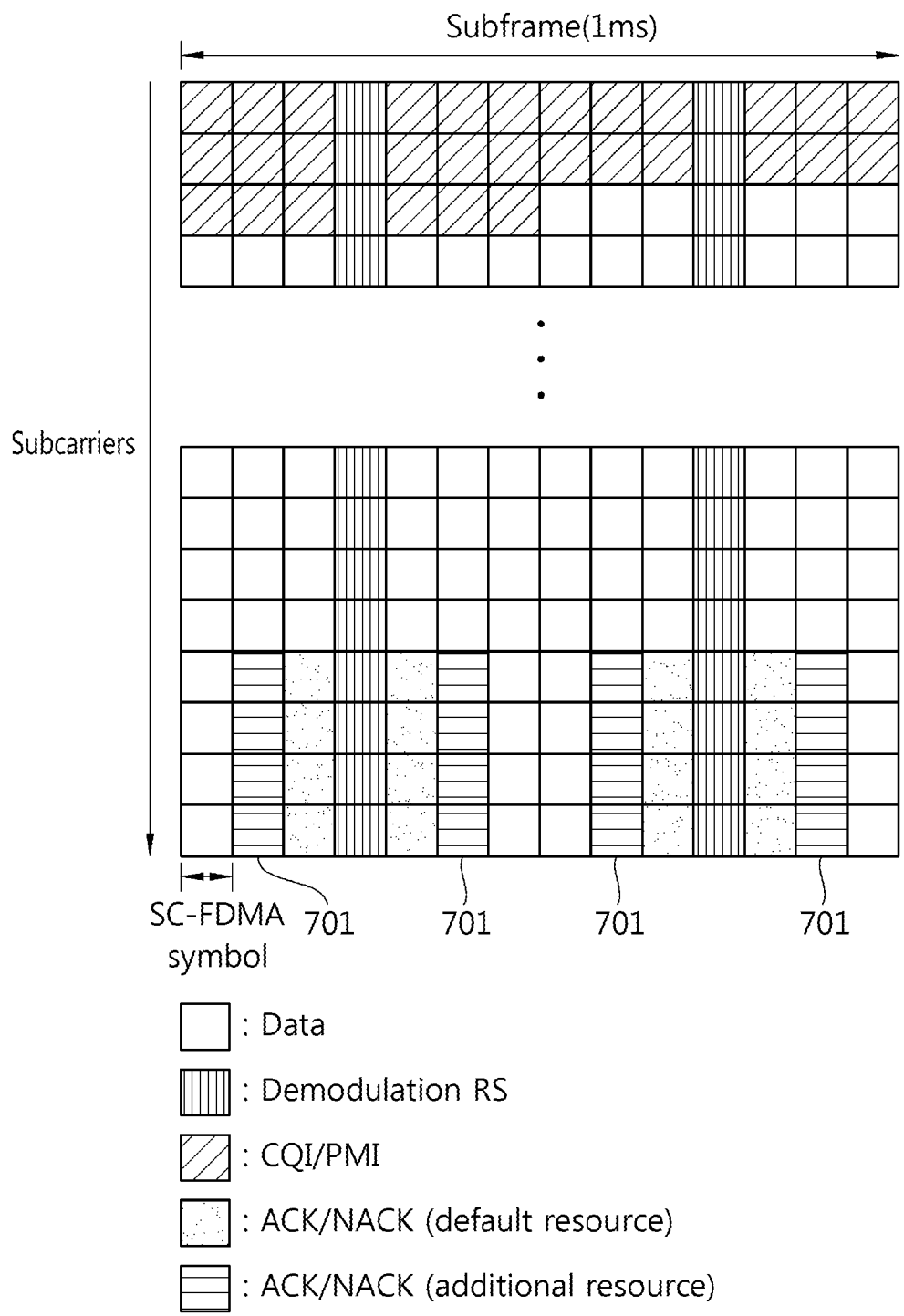
FIG. 7 shows an example of SC-FDMA symbols to which ACK/NACK is additionally mapped.

FIG. 7 shows an example of SC-FDMA symbols to which ACK/NACK is additionally mapped.

Referring to FIG. 7, in a PUSCH region of a subframe, a demodulation-reference signal (DM-RS) is allocated to each SC-FDMA symbol of a 1$^{st}$ slot and a 2$^{nd}$ slot. The DM-RS is a reference signal used to demodulate data and control information transmitted in the PUSCH region. An example of allocating the DM-RS to a 4$^{th}$ SC-FDMA symbol (hereinafter, simply referred to as a symbol) of the 1$^{st}$ slot and the 2$^{nd}$ slot is shown in FIG. 7. CQI/PMI may be allocated for one subcarrier from a 1$^{st}$ symbol to an available last symbol of a subframe for one subcarrier, and thereafter may be allocated to next subcarriers. That is, it may be allocated from the 1$^{st}$ symbol to the last symbol of a subframe by excluding a symbol to which DM-RS is allocated. ACK/NACK may be transmitted by being additionally mapped to symbols (i.e., symbols indicated by ACK/NACK (default resource)) adjacent to symbols to which the DM-RS is allocated and symbols 701 not adjacent to SC-FDMA symbols to which the DM-RS is mapped. That is, although the maximum number of symbols to which the ACK/NACK can be allocated is 4, it may be greater than or equal to 5 according to the present invention.

2) Alternatively, PUSCH transmission may be dropped according to a specific criterion (e.g., when four SC-FDMA symbols are not sufficient as resources for ACK/NACK transmission), and only ACK/NACK may be transmitted by using a PUCCH format dedicated for ACK/NACK transmission. That is, if it is difficult to transmit the ACK/NACK through a PUSCH in a piggyback manner, instead of PUSCH transmission, only the ACK/NACK is transmitted through a PUCCH.

3) Alternatively, in case of satisfying a condition in which a situation where resources allocated to transmit ACK/NACK multiplexed in a PUSCH are insufficient frequently occurs, PUSCH transmission is dropped, and only ACK/NACK is transmitted by using a PUCCH format dedicated for ACK/NACK transmission. Although PUSCH transmission is dropped in the method 2 when resources for ACK/NACK transmission are insufficient in a PUSCH, the method 3 is different in that PUSCH transmission is dropped and ACK/NACK is transmitted through a PUCCH when a situation where the resources for ACK/NACK transmission are insufficient in the PUSCH occurs more frequently than a specific level. A BS may report to a UE about a configuration on whether to drop PUSCH transmission or a condition/duration or the like for dropping through signaling (e.g., RRC messages). Alternatively, whether to drop PUSCH transmission may operate by interworking with a predetermined specific configuration. For example, the PUSCH transmission may be dropped when it is configured to bundle 5 or more PUSCH subframes.

The methods 1 to 3 may be applied when subframe bundling of a PUSCH is used for a coverage increase. For example, this situation may be a case where 5 or more subframes are transmitted through bundling.

When $N_{PRB}$ is allocated by using subframe bundling, an effective code rate of data is in inverse proportion to the number of bundled subframes, whereas when the number of symbols occupied by ACK/NACK is calculated, only one subframe is configured. Therefore, the number of symbols occupied by ACK/NACK may be calculated by considering the total number of resource blocks used in the total number $N_{subframe\_PUSCH}$ of subframes used in subframe bundling.

For example, $M_{HARQ-ACK}$ may be calculated by the following equation.

$$M_{HARQ-ACK} = \left\lceil N_{HARQ-ACK} \cdot 10^{\frac{\Delta_{HARQ-ACK}}{10}} \cdot MCS_{ref} \cdot N_{subframe\_PUSCH} \right\rceil \quad \text{[Equation 5]}$$

When the ACK/NACK repetition is applied, a resource occupied by ACK/NACK to puncture a PUSCH in one subframe may be calculated by considering total resources allocated to the ACK/NACK according to the number $N_{subframe\_ANrepetition}$ of repeated subframes.

For example, $M_{HARQ-ACK}$ may be calculated by the following equation.

$$M_{HARQ-ACK} = \left\lceil N_{HARQ-ACK} \cdot 10^{\frac{\Delta_{HARQ-ACK}}{10}} \cdot MCS_{ref} \cdot \frac{N_{subframe\_PUSCH}}{N_{subframe\_ANrepetition}} \right\rceil \quad \text{[Equation 6]}$$

Meanwhile, when ACK/NACK is multiplexed in a PUSCH without having to drop the PUSCH, it may be necessary to maintain the same resource amount as that of multiplexing in one subframe during which subframe bundling or ACK/NACK repetition is not applied.

For this, $N_{subframe\_PUSCH}$ and $N_{subframe\_ANrepetition}$ may be set identically.

In this case, scheduling may be achieved such that an ACK/NACK transmission start point based on PDSCH scheduling and a transmission start point of a PUSCH are identical. For this, regarding a control channel for scheduling the PUSCH, PUSCH scheduling may be performed in a subframe n-4 when a transmission start subframe of a PDSCH is n. When the control channel is transmitted/received in one subframe, scheduling is achieved in that subframe.

Scheduling may be achieved to completely transmit the PDSCH in the subframe n-4, so that ACK/NACK is transmitted in the subframe. When the PDSCH is transmitted/received in one subframe, scheduling is achieved such that it is transmitted/received in that subframe.

<Method of Selecting TB Size in Multiple Subframe/Cross Subframe Scheduling>

Figure 8:
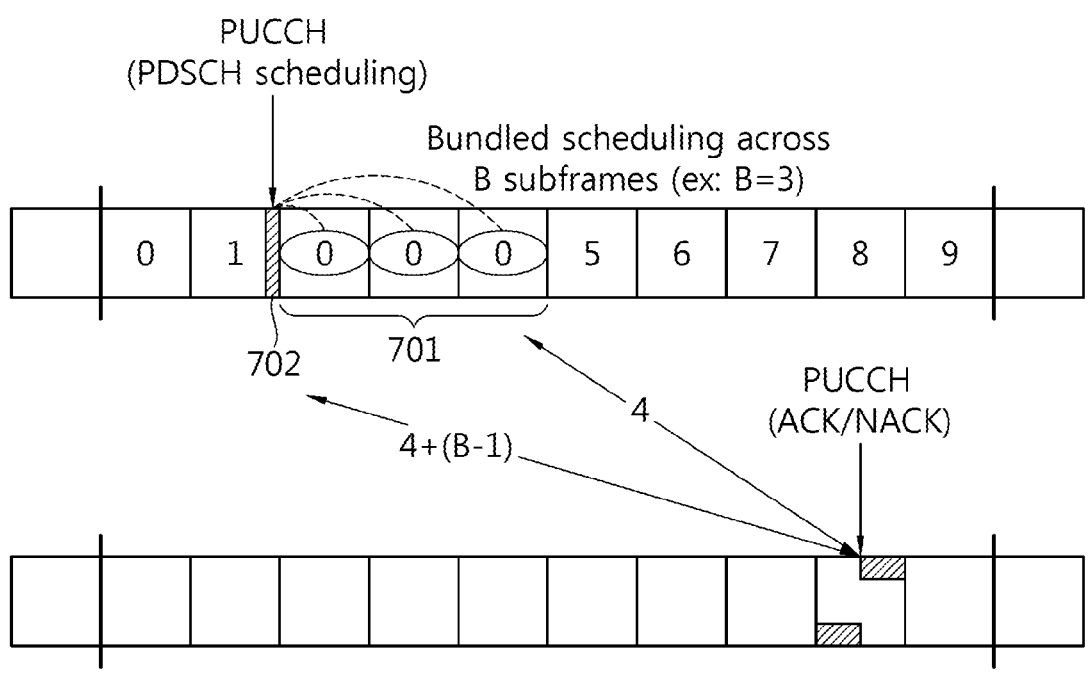
FIG. 8 shows an example of an HARQ process when performing multiple subframe scheduling.

FIG. 8 shows an example of an HARQ process when performing multiple subframe scheduling.

Referring to FIG. 8, PDSCHs of multiple subframes 701 may be scheduled by using one PDCCH 702 according to multiple subframe scheduling. In this case, one codeword may be transmitted through the scheduled multiple subframes 701. That is, an HARQ operation having the same HARQ index in the multiple subframes may be performed. In this case, the number of effective resource blocks is in proportion to the number of scheduled subframes. The codeword may be obtained by performing channel coding on a TB.

The PDCCH 702 includes a resource allocation field indicating resource blocks allocated in one subframe. It may be ineffective to increase the resource allocation field to indicate resource blocks allocated to the multiple subframes when performing the multiple subframe scheduling. Accordingly, the number of effective resource blocks may be obtained by multiplying the number of resource blocks allocated in one subframe by the number B of scheduled subframes when performing the multiple subframe scheduling. The number of effective resource blocks may be mapped to $N_{PRB}$ shown in the above Tables 5 and 6 or the like to obtain a TB size.

Figure 9:
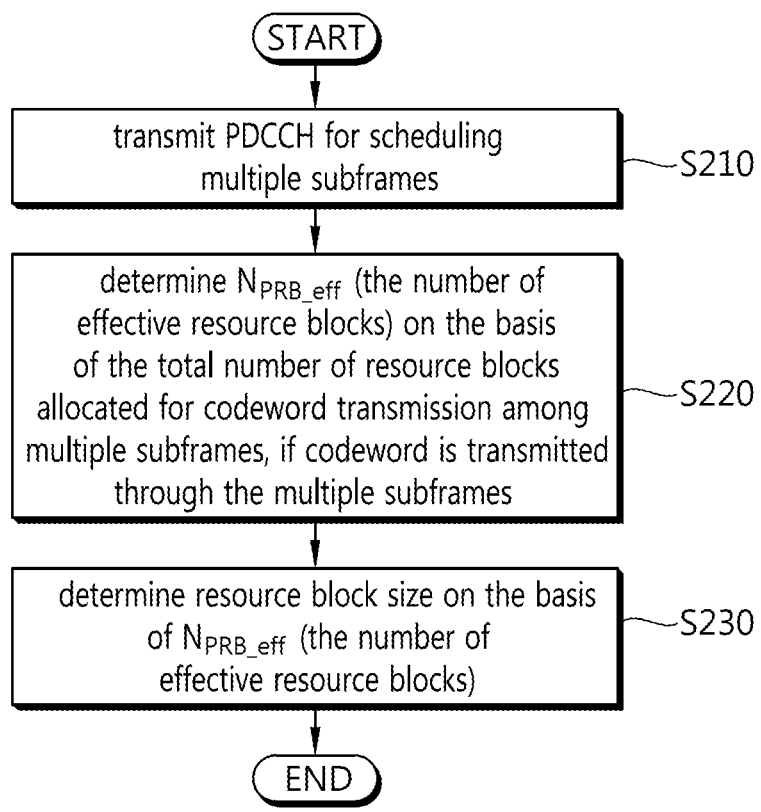
FIG. 9 shows a method of determining a TB size according to another embodiment of the present invention.

FIG. 9 shows a method of determining a TB size according to another embodiment of the present invention. This method may be applied in a downlink, and an entity for performing this method may be a BS. In addition, from a perspective of a UE, a reception operation may be performed under the assumption that a TB is transmitted by the BS with a TB size determined by the present invention.

Referring to FIG. 9, the BS transmits a PDCCH for scheduling multiple subframes (S210). Downlink control information included in the PDCCH may simultaneously schedule a plurality of downlink subframes.

When a codeword is transmitted through the multiple subframes, the BS determines the number of effective resource blocks on the basis of the total number of resource blocks allocated to transmit the codeword in the multiple subframes (S220). For example, if data (codeword) is transmitted through a plurality of downlink subframes, the number of effective resource blocks may be determined on the basis of a resource amount obtained by multiplying the number of a plurality of downlink subframes by the number of resource blocks allocated respectively to the plurality of downlink subframes. Each of the plurality of downlink subframes may have the same number of resource blocks allocated thereto.

The BS determines a resource block size on the basis of the number of effective resource blocks (S230).

FIG. 10 shows other examples of an HARQ process when performing multiple subframe scheduling.

In FIG. 10(*a*), each of a plurality of subframes for which multiple subframe scheduling is performed is subjected to the HARQ process individually, and has the same ACK/NACK round trip time (RTT). In FIG. 10(*b*), each of the plurality of subframes for which multiple subframe scheduling is performed is subjected to the HARQ process individually, and has a different ACK/NACK RTT. That is, ACK/NACK for the plurality of subframes for which multiple subframe scheduling is performed is transmitted in the same subframe.

Meanwhile, in multiple subframe/cross subframe scheduling, there may be a case where the number of effective resource blocks is greater than $N_{PRB}$. For this, the above Tables 5, 6, or the like may be newly defined, or mapping may be performed by using a table extendedly applied for multiple layers, or this may be recognized as an error situation.

Alternatively, a method of limiting the maximum number of allocation resource blocks or decreasing a bandwidth itself may be applied according to the number of multiple subframes to be simultaneously scheduled.

In the multiple subframe scheduling, a duration including subframes to be scheduled may be called a subframe window. A subframe with a normal CP and a subframe with an extended CP may coexist in the subframe window. In this case, a subframe used as a reference for resource allocation may be configured, and the number of effective resource blocks may be calculated by considering a fact that the number of REs transmitted for each subframe is different for a subframe having a CP different from a CP of that subframe. An MCS may be determined by considering a resource which collides in resource allocation or of which scheduling is limited, etc. Alternatively, the MCS may be determined under the premise that all allocated resources are used.

A decrease in resource blocks, a decrease in REs, and a decrease in OFDM symbols occur in the following cases, which may also be applied to calculate the effective number of resource blocks. The cases to be considered may be a case of: 1) a decrease/increase of a PDSCH due to a difference of an OFDM start symbol between respective subframes in a subframe window when performing multiple subframe scheduling; 2) a decrease/increase of a scheduled PDSCH due to a collision with a positioning reference signal (PRS); 3) a decrease/increase of a scheduled PDSCH due to a collision with transmission of an enhanced-PDCCH (E-PD-CCH) (in particular, a common search space (CSS), a PHICH); 4) a decrease/increase of a scheduled PDSCH due to a collision with transmission of an enhanced-PHICH (E-PHICH); 5) a decrease/increase of a scheduled PDSCH due to a collision with transmission of a system information block (SIB); 6) a decrease/increase of a scheduled PDSCH due to a collision with transmission a primary synchronization signal (PSS) and a secondary synchronization signal (SSS); 7) a decrease/increase of a scheduled PDSCH due to a collision with a physical multicast channel (PMCH); and 8) a decrease/increase based on a PDSCH non-allocated region designated for each subframe.

An effective MCS and IBS may differ for each subframe. This is also applicable to a case where a channel environment and an interference amount are different for each subframe in an inter-cell interference coordination (ICIC) environment.

By considering that an MCS different from the reference MCS is used, an MCS for a subframe set having a different feature may be allocated to DCI for performing multiple subframe scheduling, or an offset value or a weight may be applied thereto. For example, an offset value/weight used to apply $N_{PRB}$ in TBS selection may be allocated. In an uplink case, a plurality of TPC values may be set to the DCI for scheduling the multiple subframes so that an absolute value and/or an accumulated value of a UL TPC are set differently for subframes having different interference environments.

Figure 11:
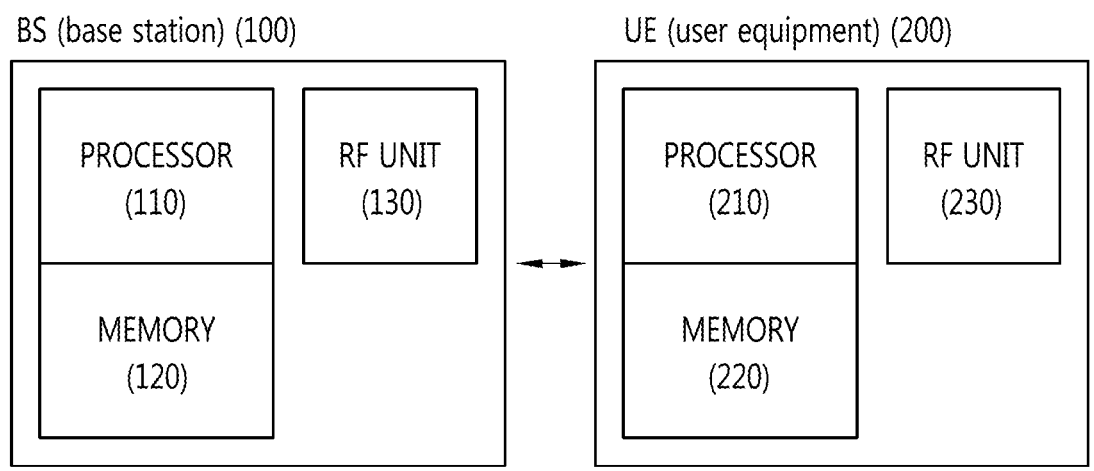
FIG. 11 shows a structure of a BS and a UE according to an embodiment of the present invention.

FIG. 11 shows a structure of a BS and a UE according to an embodiment of the present invention.

A BS 100 includes a processor 110, a memory 120, and a radio frequency (RF) unit 130. The processor 110 implements the proposed functions, procedures, and/or methods. For example, the processor 110 may determine the number of effective resource blocks, and determines a TB size of data transmitted on a downlink data channel according to the number of effective resource blocks. If the data is transmitted through a plurality of downlink subframes, the number of effective resource blocks may be determined on the basis of a resource amount obtained by multiplying the number of the plurality of downlink subframes by the number of resource blocks allocated respectively to the plurality of downlink subframes. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. For example, the processor 210 may determine the number of effective resource blocks, and may determine a TB size of data transmitted on an uplink data channel according to the number of effective resource blocks. The number of effective resource blocks is determined on the basis of the remaining resources by excluding resources for transmitting control information from resources allocated to the uplink data channel. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, and/or a data processing unit and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

What is claimed is:

1. A method for transmitting data and acknowledgement/negative-acknowledgement (ACK/NACK) in a wireless communication system, the method performed by a user equipment (UE) and comprising:
   determining a number of effective resource blocks;
   determining a transport block size (TBS) of data transmitted on an uplink data channel according to the number of effective resource blocks;
   multiplexing the data and the ACK/NACK in a transport block having the determined TBS; and
   transmitting the data and the ACK/NACK through the uplink data channel,
   wherein the number of effective resource blocks is determined based on remaining resources by excluding resources for transmitting control information from resources allocated to the uplink data channel,
   wherein the resources for transmitting control information are calculated using a predetermined modulation and coding scheme (MCS) regardless of an actual MCS applied to the control information, and
   wherein a number of symbols ($M_{HARQ-ACK}$) used to transmit the ACK/NACK is determined by the following equation, $$M_{HARQ-ACK} = \left\lceil N_{HARQ-ACK} \cdot 10^{\frac{\Delta_{HARQ-ACK}}{10}} \cdot MCS_{ref} \right\rceil,$$

where $N_{HARQ-ACK}$ denotes a payload size of the ACK/NACK, $\Delta_{HARQ-ACK}$ denotes a variable which indicates an offset value in unit of decibel (dB) to compensate for a difference between a block error rate (BLER) of the data and a BLER of the ACK/NACK and a difference between a method of encoding the data and a method of encoding the ACK/NACK, and $MCS_{ref}$ denotes an MCS used in encoding of the data.

2. The method of claim 1, wherein the number of effective resource blocks is determined based on a value obtained by dividing the remaining resources by a unit of resource blocks.

3. The method of claim 1, wherein the uplink data channel is a physical uplink shared channel (PUSCH).

4. The method of claim 1, wherein the transport block size is determined based on an index $I_{TBS}$, which is determined by using an index $I_{MCS}$ indicating the MCS, and the number of effective resource blocks.

5. An apparatus comprising:
a radio frequency (RF) unit configured to transmit and receive a radio signal; and
a processor operatively coupled to the RF unit,
wherein the processor is configured to:
determine a number of effective resource blocks,
determine a transport block size (TBS) of data transmitted on an uplink data channel according to the number of effective resource blocks,
multiplex the data and acknowledgement/negative-acknowledgement (ACK/NACK) in a transport block having the determined TBS, and
transmit the data and the ACK/NACK through the uplink data channel,
wherein the number of effective resource blocks is determined based on remaining resources by excluding resources for transmitting control information from resources allocated to the uplink data channel,
wherein the resources for transmitting control information are calculated using a predetermined modulation and coding scheme (MCS) regardless of an actual MCS applied to the control information, and
wherein a number of symbols ($M_{HARQ-ACK}$) used to transmit the ACK/NACK is determined by the following equation, $$M_{HARQ-ACK} = \left\lceil N_{HARQ-ACK} \cdot 10^{\frac{\Delta_{HARQ-ACK}}{10}} \cdot MCS_{ref} \right\rceil,$$

where $N_{HARQ-ACK}$ denotes a payload size of the ACK/NACK, $\Delta_{HARQ-ACK}$ denotes a variable which indicates an offset value in unit of decibel (dB) to compensate for a difference between a block error rate (BLER) of the data and a BLER of the ACK/NACK and a difference between a method of encoding the data and a method of encoding the ACK/NACK, and $MCS_{ref}$ denotes an MCS used in encoding of the data.

6. The apparatus of claim 5, wherein the number of effective resource blocks is determined based on a value obtained by dividing the remaining resources by a unit of resource blocks.

7. The apparatus of claim 5, wherein the uplink data channel is a physical uplink shared channel (PUSCH).

8. The apparatus of claim 5, wherein the transport block size is determined based on an index $I_{TBS}$, which is determined by using an index $I_{MCS}$ indicating the MCS, and the number of effective resource blocks.

* * * * *